(12) United States Patent
Kim et al.

(10) Patent No.: US 9,794,045 B2
(45) Date of Patent: *Oct. 17, 2017

(54) METHOD FOR MULTIPLEXING DATA AND CONTROL INFORMATION

(71) Applicant: LG ELECTRONICS INC., Seoul (KR)

(72) Inventors: Ki Hwan Kim, Anyang-si (KR); Dae Won Lee, Anyang-si (KR); Jae Hoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 446 days.

This patent is subject to a terminal disclaimer.

(21) Appl. No.: 14/504,223

(22) Filed: Oct. 1, 2014

(65) Prior Publication Data

US 2015/0036627 A1 Feb. 5, 2015

Related U.S. Application Data

(63) Continuation of application No. 12/740,989, filed as application No. PCT/KR2008/006505 on Nov. 5, 2008, now Pat. No. 8,885,576.

(Continued)

(30) Foreign Application Priority Data

Dec. 13, 2007 (KR) .......................... 10-2007-0130442
Dec. 28, 2007 (KR) .......................... 10-2007-0140492

(Continued)

(51) Int. Cl.
*H04W 4/00* (2009.01)
*H04L 5/00* (2006.01)

(Continued)

(52) U.S. Cl.
CPC .............. *H04L 5/0055* (2013.01); *H04J 1/02* (2013.01); *H04L 1/0026* (2013.01);

(Continued)

(58) Field of Classification Search
None
See application file for complete search history.

(56) References Cited

U.S. PATENT DOCUMENTS

| 7,843,888 B1 | 11/2010 | Wang et al. |
| 8,031,688 B2 | 10/2011 | Papasakellariou et al. |

(Continued)

FOREIGN PATENT DOCUMENTS

| KR | 10-2005-0009663 A | 1/2005 |
| KR | 10-2005-0053312 A | 6/2005 |

(Continued)

*Primary Examiner* — Jutai Kao

(74) *Attorney, Agent, or Firm* — Birch, Stewart, Kolasch & Birch, LLP

(57) ABSTRACT

A method of transmitting uplink signal through a Physical Uplink Shared Channel (PUSCH) by a mobile device in a wireless communication system. The method includes generating multiplexed information by multiplexing a first type of control information and data information; and transmitting the multiplexed information and a second type of control information through the PUSCH. One or more Resource Blocks (RBs) for the PUSCH include N Single Carrier Frequency Division Multiple Access (SC-FDMA) symbols in a slot. The multiplexed information is mapped on a first set of SC-FDMA symbols, and the first set of SC-FDMA symbols includes SC-FDMA symbols other than an $(N-3)^{th}$ SC-FDMA symbol for a reference signal in the slot. The second type of control information is mapped on $(N-4)^{th}$ and $(N-2)^{th}$ SC-FDMA symbols in the slot, and the (Continued)

second type of control information includes Acknowledgement/Negative Acknowledgement (ACK/NACK) information.

10 Claims, 7 Drawing Sheets

Related U.S. Application Data

(60) Provisional application No. 60/985,287, filed on Nov. 5, 2007, provisional application No. 60/988,092, filed on Nov. 14, 2007, provisional application No. 60/992,687, filed on Dec. 5, 2007, provisional application No. 61/019,835, filed on Jan. 8, 2008, provisional application No. 61/020,373, filed on Jan. 10, 2008.

(30) Foreign Application Priority Data

Jan. 4, 2008 (KR) .......... 10-2008-0001422
Jan. 8, 2008 (KR) .......... 10-2008-0002268
Oct. 31, 2008 (KR) .......... 10-2008-0107597

(51) Int. Cl.
*H04W 72/04* (2009.01)
*H04L 1/00* (2006.01)
*H04L 1/16* (2006.01)
*H04J 1/02* (2006.01)

(52) U.S. Cl.
CPC .......... *H04L 1/0072* (2013.01); *H04L 1/1664* (2013.01); *H04L 1/1671* (2013.01); *H04L 5/0007* (2013.01); *H04L 5/0053* (2013.01); *H04W 72/04* (2013.01)

(56) References Cited

U.S. PATENT DOCUMENTS

| | | | |
|---|---|---|---|
| 8,885,576 B2 * | 11/2014 | Kim | .......... H04L 1/0026 370/329 |
| 2007/0010268 A1 | 1/2007 | Kim et al. | |
| 2007/0064666 A1 | 3/2007 | Kwun et al. | |
| 2007/0183384 A1 | 8/2007 | Kwak et al. | |
| 2008/0240022 A1 | 10/2008 | Yoon et al. | |
| 2010/0235712 A1 | 9/2010 | Bhushan | |

FOREIGN PATENT DOCUMENTS

| | | |
|---|---|---|
| KR | 10-2007-0027999 A | 3/2007 |
| KR | 10-2007-0074438 A | 7/2007 |
| WO | WO 03/033776 A1 | 4/2003 |
| WO | WO 2007/084482 A2 | 7/2007 |

* cited by examiner

METHOD FOR MULTIPLEXING DATA AND CONTROL INFORMATION

CROSS-REFERENCE TO RELATED APPLICATIONS

This application is a Continuation of co-pending U.S. application Ser. No. 12/740,989 filed on Jun. 15, 2010, which is the National Phase of PCT/KR2008/006505 filed on Nov. 5, 2008, which claims priority under 35 U.S.C. 119(e) to U.S. Provisional Application No(s). 60/985,287 filed on Nov. 5, 2007, 60/988,092 filed on Nov. 14, 2007, 60/992,687 filed on Dec. 5, 2007, 61/019,835 filed on Jan. 8, 2008, and 61/020,373 filed on Jan. 10, 2008, under 35 U.S.C. 119(a) to Patent Application No(s). 10-2007-0130442 filed in Republic of Korea on Dec. 13, 2007, 10-2007-0140492 filed on Dec. 28, 2007, 10-2008-0001422 filed on Jan. 4, 2008, and 10-2008-0002268 filed on Jan. 8, 2008, all of which are hereby expressly incorporated by reference into the present application and under 35 U.S.C. 119(a) to Patent Application No. 10-2008-0107597 filed in Republic of Korea on Oct. 31, 2008.

BACKGROUND OF THE INVENTION

Field of the Invention

The present invention relates to a method for multiplexing data and control sequences and mapping the multiplexed sequences to a physical channel in a wireless mobile communication system.

Discussion of the Related Art

Data and control sequences transmitted from a media access control (MAC) layer to a physical layer are encoded and then provide transport and control services through a radio transmission link. A channel coding scheme is comprised of a combination of processes of error detection, error correction, rate matching, interleaving, and mapping of transport channel information or control information to the physical channel. Data transmitted from the MAC layer includes systematic bits and non-systematic bits according to the channel coding scheme. The non-systematic bits may be parity bits.

In the 3$^{rd}$ generation partnership project (3GPP), an uplink shared channel (UL-SCH) and a random access channel (RACH) of an uplink transport channel may be mapped to a physical uplink shared channel (PUSCH) and a packet random access channel (PRACH) of a physical channel, respectively. Uplink control information (UCI), which is one from of uplink control channel information, may be mapped to a physical uplink control channel (PUCCH) and/or a PUSCH. In a channel such as a UL-SCH, processing for cyclic redundancy check (CRC), code block segmentation, channel coding, rate matching, and code block concatenation is performed with respect to at least one transport channel or control information.

A process for processing a transport channel and/or control information is illustrated in FIG. 1. Data in the form of a transport block is input every transmission time interval (TTI). The transport block is processed as follows. A CRC attachment block attaches a CRC to the data in the form of a transport block. A code block segmentation block segments the CRC-attached data into one or more code blocks. A channel coding block performs channel coding for a code block data stream of each of the segmented code blocks. A rate matching block performs rate matching for the channel coded data stream. A code block concatenation block concatenates one or more rate-matched data streams to form a sequence of encoded data bits. Meanwhile, a separate channel coding block performs channel coding for control information to form a sequence of encoded control bits. A data/control multiplexing block multiplexes the sequence of encoded data bits and the sequence of encoded control bits, thereby generating a sequence of multiplexed bits.

One symbol may be comprised of at least one bit according to a modulation order (Qm). For example, for BPSK, QPSK, 16QAM, and 64QAM, one bit, two bits, four bits, and six bits corresponding respectively thereto constitute one symbol. In a system using single-carrier frequency division multiple access (SC-FDMA), one symbol is mapped to one resource element (RE), and therefore, a description can be given in units of symbols.

A conventional transport channel processing is illustrated in FIG. 2. FIG. 2 illustrates n resource blocks (RBs) having a matrix structure of 'R' rows by 'C' columns (R*C) (for example, C=14). C successive symbols are arranged in a time area in a horizontal direction and R subcarriers are arranged in a frequency area in a vertical direction. In a normal cyclic prefix (CP) configuration, 14 (C=14) symbols constitute one sub-frame. In an extended CP configuration, 12 (C=12) symbols may constitute one sub-frame. That is, FIG. 2 is based on the normal CP configuration. If the extended CP configuration is used, FIG. 2 may have a matrix structure in which C is 12. Referring to FIG. 2, M symbols (=the number of symbols×the number of subcarriers=C×R) may be mapped with respect to one RB. Namely, M symbols may be mapped to M resource elements per RB. In addition to symbols generated by multiplexing data symbols and control symbols, reference signal (RS) symbols and/or sounding RS (SRS) symbols may be mapped to the M resource elements. Therefore, if K RS symbols and/or SRS symbols are mapped, (M-K) multiplexed symbols may be mapped.

In FIG. 2, multiplexed data and control information are mapped to a data channel in units of modulation symbols in consideration of a modulation order. Mapping is performed rightwards starting from a left-top position of the first RB. If mapping is completed, mapping for the next subcarrier is performed. Within each subcarrier, mapping is implemented rightwards. Multiplexing may be carried out by inserting or rate-matching control information to a position at which the control information out of data information is to be mapped. Alternatively, multiplexing may be performed by puncturing data information. When multiplexed data and control information are mapped to a data channel, the control information is mapped to SC-FDMA symbols near to an RS which is less influenced by in high-speed mobile environment, and the data is mapped in a manner of avoiding SC-FDMA symbols allocated for control information and RS mapping, that is, the data is mapped to REs except for REs of positions of those SC-FDMA symbols.

According to the method of FIG. 2, when various types of control information are mapped, the locations of the respective control information can not be determined. In addition, if the amount of control information which can be included per SC-FDMA symbol is calculated in consideration of the length of the control information and a modulation order and then the control information is multiplexed with data, for example, if control information 1 is mapped to REs near to an RS and control information 2 is mapped to REs apart from the RS, unbalance occurs between the control information 1 and the control information 2. Accordingly, if a capability condition demanded by the control information 2 is higher than a capability condition demanded by the control information 1, the capability condition demanded by the control information 2 may not be satisfied. Moreover, if the control information 1 is rate-matched with the data for multiplexing and if the control information 2 punctures data for multiplexing, data of code blocks input first by the control information 2 can not be mapped to REs near to the RS relative to data of code blocks which is input later. Namely, the control information 2 may be mapped so as to be concentrate upon a specific RB. The nearer REs are to the RS, the better transmission performance is. However, if different error rates occur for respective code blocks in the same transmission environment, transmission system performance may be degraded,

SUMMARY OF THE INVENTION

An object of the present invention devised to solve the problem lies in providing a method for mapping control information by a prescribed rule considering presence/absence and types of the control information to improve the performance of a wireless radio communication system.

The object of the present invention can be achieved by providing a method for multiplexing data information and a plurality of control information in a wireless mobile communication system. The method includes mapping first control information in units of resource elements onto a matrix for generating input information mapped to a resource block, and mapping second control information onto the matrix so as to map the second control information to resource elements adjacent in a time axis to resource elements allocated for mapping of a reference signal in the resource block, wherein the first control information is mapped downwards starting from the first row so as not to overwrite the resource elements allocated for mapping of the reference signal.

Symbols of the first control information mapped to each row of the matrix may be mapped rightwards starting from a leftmost element of the matrix, may be mapped leftwards starting from a rightmost element, or may be mapped in a predetermined order. Further, the monitoring monitors the plurality of candidate PDCCHs based on a PDCCH whose order of priority has been set in the overlapping section.

The number of symbols of the first control information may be a multiple of the number of single-carrier frequency division multiple access (SC-FDMA) symbols which are not allocated for mapping of the reference signal among SC-FDMA symbols constituting the resource block.

The number of symbols of the second control information may be a multiple of the other subcarriers except for subcarriers allocated for mapping of the first control information among ail subcarriers constituting the resource block.

The second control information may be mapped onto the matrix in units of resource elements.

The second control information may be mapped onto the matrix in units of one set consisting of a plurality of predetermined resource elements within each subcarrier of the resource block.

The plurality of resource elements constituting the one set may be resource elements adjacent in a time axis to the resource elements allocated for mapping of the reference signal.

The plurality of resource elements constituting the one set may be resource elements adjacent in a time axis to the resource elements allocated for mapping of the reference signal, and resource elements separated by one resource element in a time axis from the resource element allocated for mapping of the reference signal.

In another aspect of the present invention, provided herein is a method for multiplexing data information and a plurality of control information in a wireless mobile communication system. The method includes mapping first control information onto a matrix for generating input information mapped to a resource block, and mapping second control information onto the matrix, wherein the first control information and the second control information are mapped so as not to overwrite resource elements allocated for mapping of a reference signal, each of the number of the first control information and the number of the second control information is a multiple of the number of SC-FDMA symbols which are not allocated for mapping of the reference signal among SC-FDMA symbols constituting the resource block, and the sum of the number of subcarriers to which the first control information is mapped and the number of subcarriers to which the second control information is mapped is the same as the number of subcarriers constituting the resource block.

Symbols of the first control information mapped to each row of the matrix may be mapped rightwards starting from a leftmost element of the matrix, may be mapped leftwards starting from a rightmost element, or may be mapped in a predetermined order.

Symbols of the second control information mapped to each row of the matrix may be mapped rightwards starting from a leftmost element of the matrix, may be mapped leftwards starting from a rightmost element, or may be mapped in a predetermined order.

In a further aspect of the present invention, provided herein is a method for multiplexing data information and a plurality of control information in a wireless mobile communication system. The method includes mapping first control information onto a matrix for generating input information mapped to a resource block so that the first control information is mapped to resource elements adjacent in a time axis to resource elements allocated for mapping of a reference signal, and mapping second control information onto the matrix so that the second control information is mapped to resource elements adjacent in a time axis to the resource elements allocated for mapping of the reference signal, wherein each of the first control information and the second control information is mapped in units of one set consisting of a plurality of predetermined resource elements within each subcarrier of the resource block.

The plurality of resource elements constituting the one set may be resource elements adjacent in a time axis to the resource elements allocated for mapping of the reference signal.

The plurality of resource elements constituting the one set may be resource elements adjacent in a time axis to the resource elements allocated for mapping of the reference signal, and resource elements separated by one resource element in a time axis from the resource element allocated for mapping of the reference signal.

In another aspect of the present invention, provided herein is a wideband wireless mobile communication device, including a data and control multiplexing unit for multiplexing first control information and data information, and a matrix generation unit for generating a matrix for multiplexing sequences generated from the data and control multiplexing unit and second control information, wherein the matrix generation unit (a) maps the first control information in units of resource elements onto a matrix for generating input information mapped to a resource block, and (b) maps the second control information onto the matrix so as to map the second control information to resource elements adjacent in a time axis to resource elements allocated for mapping of a reference signal in the resource block, and wherein the first control information is mapped downwards starting from the first row so as not to overwrite the resource element allocated for mapping of the reference signal.

In another aspect of the present invention, provided herein is a wideband wireless mobile communication device, including a data and control multiplexing unit for multiplexing first control information and data information, and a matrix generation unit for generating a matrix for multiplexing sequences generated from the data and control multiplexing unit and second control information, wherein the matrix generation unit (a) maps the first control information onto a matrix for generating input information mapped to a resource block, and (b) maps the second control information onto the matrix, and wherein the first control information and the second control information are mapped so as not to overwrite resource elements allocated for mapping of a reference signal, each of the number of the first control information and the number of the second control information is a multiple of the number of SC-FDMA symbols which are not allocated for mapping of the reference signal among SC-FDMA symbols constituting the resource block, and the sum of the number of subcarriers to which the first control information is mapped and the number of subcarriers to which the second control information is mapped is the same as the number of subcarriers constituting the resource block.

In another aspect of the present invention, provided herein is a wideband wireless mobile communication device, including a data and control multiplexing unit for multiplexing first control information and data information, and a matrix generation unit for generating a matrix for multiplexing sequences generated from the data and control multiplexing unit and second control information, wherein the matrix generation unit (a) maps first control information onto a matrix for generating input information mapped to a resource block so that the first control information is mapped to resource elements adjacent in a time axis to resource elements allocated for mapping of a reference signal, and (b) maps second control information onto the matrix so that the second control information is mapped to resource elements adjacent in a time axis to the resource elements allocated for mapping of the reference signal, wherein each of the first control information and the second control information is mapped in units of one set consisting of a plurality of predetermined resource elements within each subcarrier of the resource block.

In mapping data and control information, uniform multiplexing and mapping rules considering presence/absence of control information and types of control information are provided.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
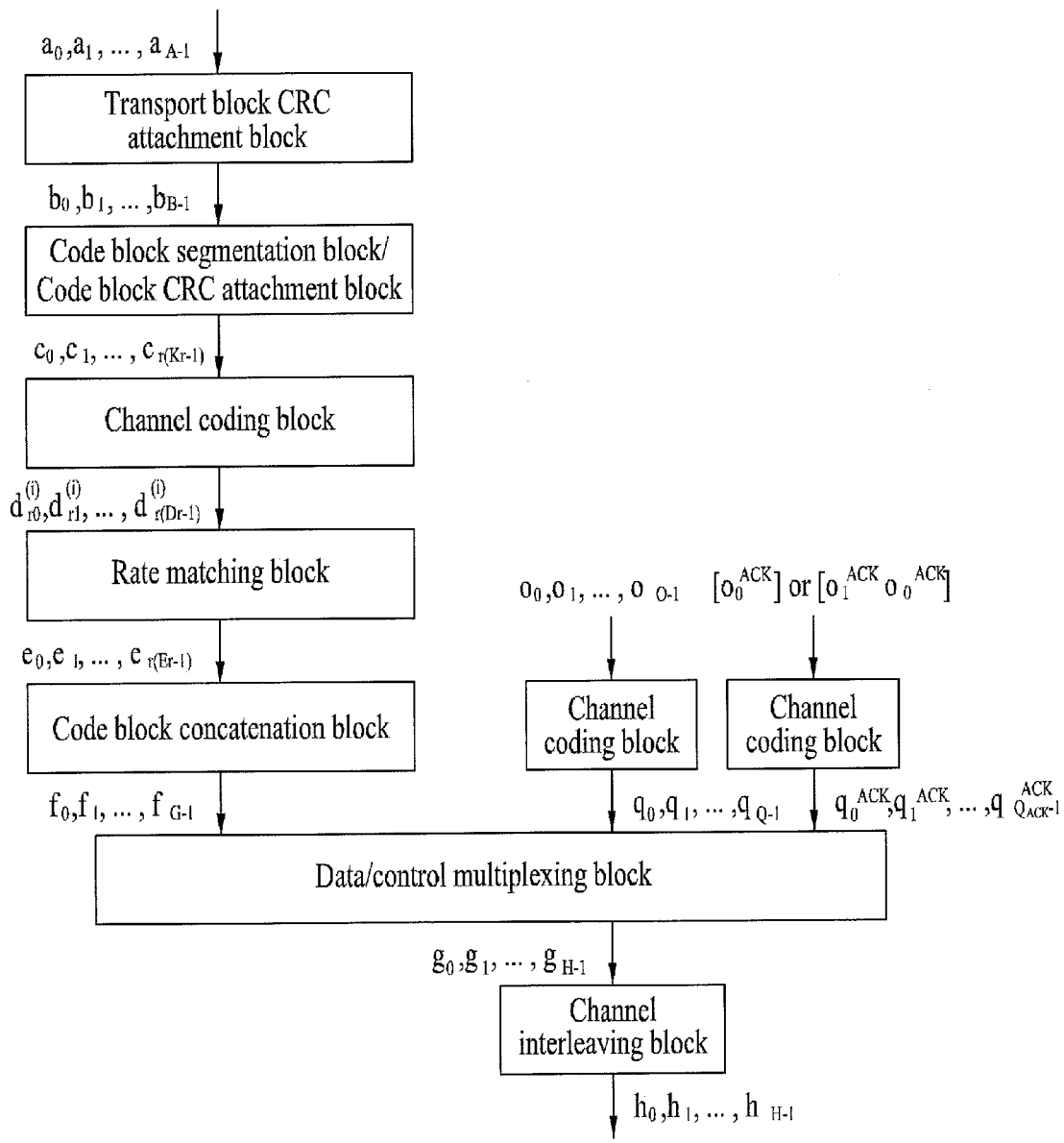
FIG. 1 illustrates general processing for a transport channel and/or control information.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. The same reference numbers will be used throughout this specification to refer to the same or like parts.

Suffixes 'module' and 'part' of constituent elements used in the following description are simply added in consideration of ease of description and do not have any special importance or role. Therefore, the terms 'module' and 'part' can be used interchangeably.

In actual implementation, each element in a block diagram may be divided into two hardware chips, or two or more elements may be integrated into one hardware chip.

Exemplary embodiments described hereinbelow may be used for processing of a transport channel of the 3GPP, especially a UL-SCH.

Control information may be classified into various types according to an arbitrary method or 'importance' thereof. Here, 'importance' may be determined by evaluating a degree of influence on the capability of a wireless mobile communication system when transmission of any type of control information fails. When multiple types of control information are present, a new multiplexing scheme is required to improve the capability of a wireless mobile communication system. For example, control information of a more important type may be multiplexed so as not to be overwritten by control information of a less important type.

In the present invention, control information 1 may be channel quality information (CQI)/precoding matrix index (PMI) which is a combination of CQI indicating channel quality and of a PMI indicating index information of a codebook used for pre-coding. The control information 1 may rate-match with data information for multiplexing. Control information 2 may be acknowledgement/negative acknowledgement (ACK/NACK) which is a hybrid automatic repeat request (HARQ) response. The control information 2 may puncture the data information or the control information 1 for multiplexing.

Structures of exemplary embodiments proposed by the present invention may be modified and applied to a structure of up-down or right-left symmetry with respect to a frequency axis and a time axis in a set of resource elements comprised of resource elements. In the exemplary embodiments of the present invention, a symbol may be an SC-FDMA symbol.

The term 'puncturing' refers to eliminating a specific bit (or symbol) from a sequence comprised of multiple bits (or symbols) and inserting a new bit (or symbol) into the sequence. That is, puncturing serves to replace a part of information with other information, and when data information or control information is multiplexed, a bit (or symbol) of punctured information is replaced with puncturing information. When a puncturing scheme is used, the length of whole bits (or symbols) is maintained even after new information is inserted. A code rate of punctured information is influenced by puncturing.

The term 'rate matching' refers to adjusting a code rate of data information. When data information or control information is multiplexed, the location of such information may be changed but contents thereof are not influenced. Rate-matching control information 1 and data information means that the amount of rate-matched control information and rate-matched data information has a prescribed size. Therefore, if the amount of control information 1 to be transmitted is increased, the amount of data information rate-matching with the control information 1 is decreased by that much.

When multiplexing data information and control information, the following should be considered. First, a multiplexing rule should not be changed by the amount and type of control information or presence/absence of control information. Second, when control information is multiplexed with data by rate matching or control information punctures data and/or other types of control information, the control information should not affect transmission of other data of a cyclic buffer. Third, a starting point of a cyclic buffer for a next redundancy version should not be influenced by presence/absence of control information. Fourth, in a HARQ transmission scheme, HARQ buffer corruption should be able to be avoided. In a method for mapping multiplexed information to a data channel, a specific type of control information should be mapped to resource elements adjacent to an RS which can positively influence system performance. Moreover, since a data code rate may be affected when control information punctures data, control information should be equally distributed over entire RBs and REs. Further, evenly distributing control information in one RB as much as possible limits an influence upon successive data.

Exemplary embodiments of FIG. 3 to 11 which will be described hereinafter are based on a normal CP configuration and it is assumed that one RB is comprised of M (=R×C) resource elements. Here, 'C' denotes the number of symbol periods arranged in a time axis direction, and 'R' denotes the number of subcarriers arranged in a virtual frequency direction in one RB. The symbol period refers to a time period at which one symbol exits. Accordingly, the length of one symbol period is identical to the length of one symbol.

Meanwhile, one RB may correspond to a matrix of columns of the number C of SC-FDMA symbols constituting the RB and rows of the number R of subcarriers constituting the RB. Therefore, when one RB is included on a two-dimensional plane, REs which are constituent elements of the RB may correspond to respective elements of the matrix. This matrix may be used to generate input information mapped to the RB.

Generally, since an RS may be fixedly allocated two SC-FDMA symbols among SC-FDMA symbols of an RB, a matrix corresponding to the RB may be an R×(C−2) matrix rather than an R×C matrix.

FIGS. 3a to 3c are views explaining a structure of an RB used in FIGS. 4 to 11.

Referring to FIG. 3a, an RS is mapped to an 'RS symbol period' comprised of 'RS symbol period(0)' and 'RS symbol period(1)'. The RS symbol period(0) and the RS symbol period(1) may not be adjacent to each other.

An 'RS symbol period area' defined in the 'RS symbol period' will now be described. The RS symbol period area includes (2×R) resource elements located in the RS symbol period. The 'RS symbol period area' is divided into 'RS symbol period area(0)' and 'RS symbol period area(1)'. Each of the RS symbol period area(0) and the RS symbol period area(1) has R resource elements in a frequency direction.

Figure 3:
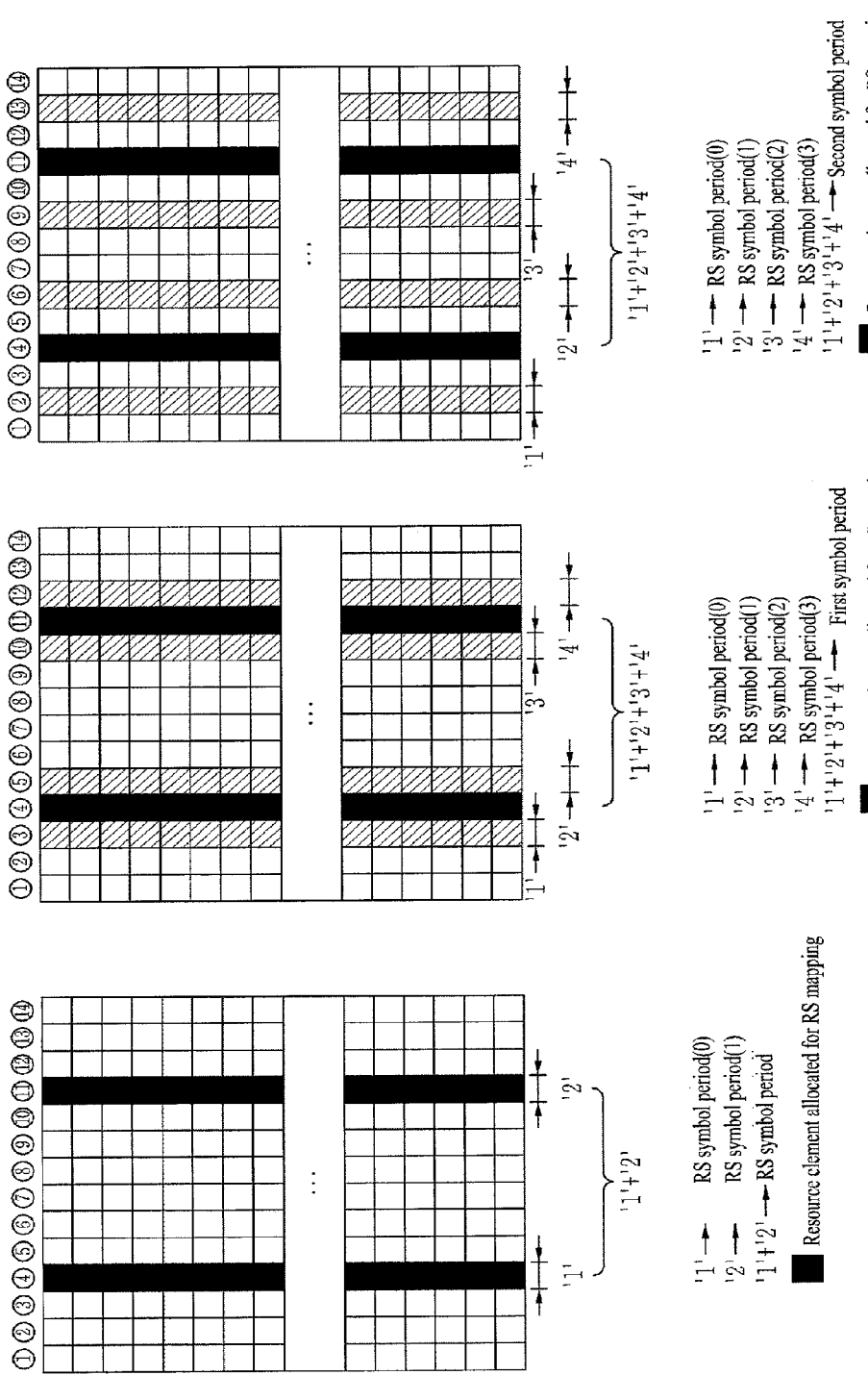
FIG. 3 is a view explaining a structure of a resource block used in FIGS. 4 to 11.

Referring to FIG. 3b, a 'first symbol period' is defined as 4 symbol periods separated from the RS symbol period by a zero symbol period. A 'first symbol period area' includes (4×R) resource elements located in the first symbol period. Therefore, in FIGS. 3a to 6, the 'first symbol period' is further divided into 'first symbol period area(0)', 'first symbol period area(1)', 'first symbol period area(2)', and 'first symbol period area(3)'.

Referring to FIG. 3c, a 'second symbol period' is defined as 4 symbol periods separated from the RS symbol period by one symbol period. A 'second symbol period area' includes (4×R) resource elements located in the second symbol period. Therefore, in FIG. 3c, the 'second symbol period area' is further divided into 'second symbol period area(0)', 'second symbol period area(1)', 'second symbol period area(2)', and 'second symbol period area(3)'.

RS symbol periods shown in FIGS. 3a to 11 are not always located in the fourth and eleventh symbol periods.

Although a set of resource elements shown in FIGS. 3a to 11 is based on the normal CP configuration, the same principle may be applied to an extended CP configuration comprised of 12 symbols.

Embodiment 1

Figure 4:
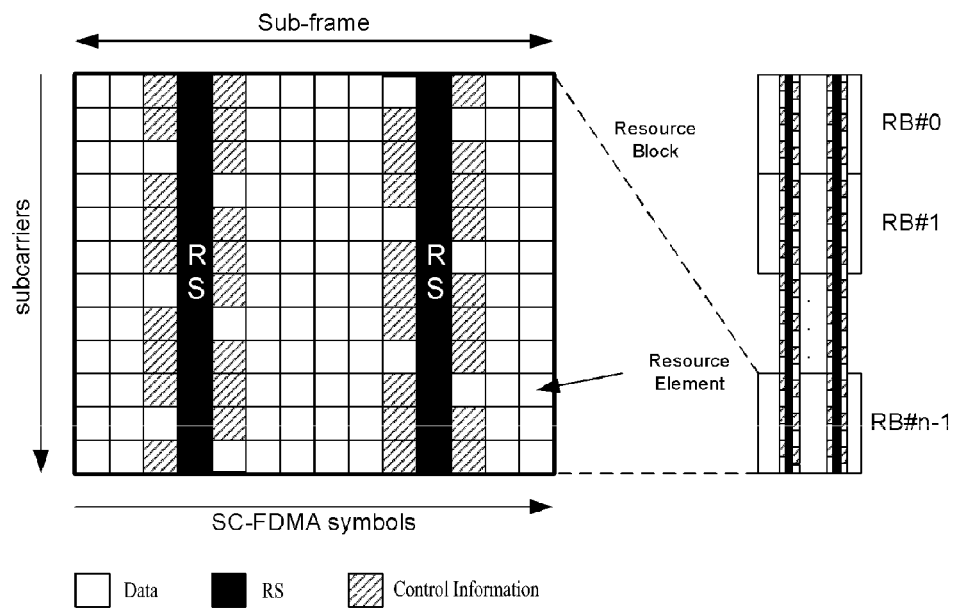
FIG. 4 is a view illustrating a control information mapping method according to an exemplary embodiment of the present invention.

FIG. 4 illustrates a control information mapping method according to an exemplary embodiment of the present invention.

In FIG. 4, control information is distributed in units of REs. The control information may be mapped to any one of the above-described first symbol period, second symbol period, and other available periods. To distribute the control information in units of REs, a rate value or a difference value is calculated between the amount of the control information for multiplexing and the amount of REs to which the control information can be mapped in an RB. The control information is rate-matched or is punctured based on the calculated rate value or difference value. That is, the mapping locations of the control information are determined according to the rate value or difference value. Hence, the control information is multiplexed with data in consideration of an interval to which the control information can be mapped in a transport, channel. If the multiplexed information is sequentially mapped in. the transport channel, the control information is evenly distributed over the entire RB in the transport channel, as illustrated in FIG. 4. The locations of REs, within each RB, mapped in units of RBs may vary according to RBs.

In a mapping method, the multiplexed information is mapped in the direction of SC-FDMA symbols (namely, according to time flow) starting from the first SC-FDMA symbol of the first subcarrier of the first RB. If mapping of SC-FDMA symbols within one subcarrier is completed, mapping is sequentially performed for the next subcarriers. The mapping may be performed in a forward (namely, according to time flow), backward (namely, according to reverse time flow), or arbitrary order. Thus the data and the control information can be multiplexed. If the amount of the control information for multiplexing is greater than the amount of the control information which can be mapped in the transport channel, an area in which the control information can be mapped can be extended up to a symbol near to an RS. For example, even though the control information is permitted to be mapped only in the above-described first symbol period, if the amount of the control information is greater than the number of REs of the first symbol period, even an area except for the first symbol period can be mapped. Furthermore, the multiplexing/mapping method can be applied in consideration of an extended area and extended amount. In the above description, the data, control information, and RE have been described in units of symbols. The number of bits denoted by each symbol should consider a modulation order. The following Table 1 indicates one example of rate-matching the control information by the above method.

TABLE 1

```
xi = no_re;
e = xi;
ep = xi;
em = xi - no_ci;
m = 1;
do
{
  e = e - em;
  if (e <= 0)
  {
    insert data;
    e = e + ep;
  }
  else
  {
    insert control information;
  }
  m++;
} while (m <= xi)
```

In Table 1, 'no_re' denotes the amount of REs to which control information can be mapped, 'no_ci' denotes the amount of the control information. Parameters 'e', 'ep', 'em', and 'm' are used for rate-matching based on the amount of REs to which the control information can be mapped and the amount of the control information. The above algorithm is repeated for each of REs to which the control information can be mapped. A rate-matching operation is performed by this algorithm and the control information can be distributed between data. To multiplex different types of control information, 'no_re' of Table 1 is set to the amount of first control information, 'no_ci' is set to the amount of second control information, and 'insert data' and 'insert control information' can express different types of control information. Table 1 is based on a symbol unit and a relationship between the control information and REs can be established considering a modulation order.

Embodiment 2

Figure 5:
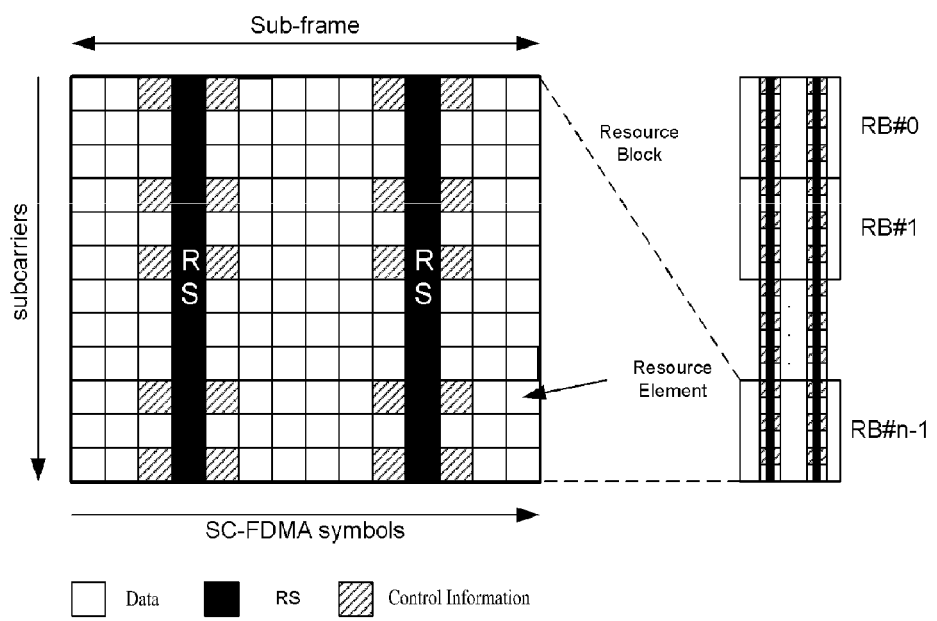
FIG. 5 is a view illustrating a control information mapping method according to another exemplary embodiment of the present invention.

In FIG. 5, control information is distributed in units of groups of REs within a subcarrier that can be allocated for the control information. A group of REs within a subcarrier refers to a set of REs that can be allocated for the control information among a plurality of REs within one subcarrier of a transmission unit. If the number of REs to which the control information can be mapped within one subcarrier is N, then N REs are mapped as one unit. For example, if only the first symbol period is permitted for mapping, the control information can be mapped to 4 REs (N=4) per subcarrier (refer to FIG. 5). As another example, if both the first symbol period and the second symbol period are permitted for mapping, the control information can be mapped to 8 REs (N=8) per subcarrier (not shown). If a remainder obtained by dividing the amount of control information by N is not 0, that is, if a result value of a modulo-N operation is not 0, control information corresponding to the result value is mapped to SC-FDMA symbols of the last subcarrier.

To distribute the control information in units of sets of REs within a subcarrier, the amount n1 of control information for multiplexing and the amount n2 of REs allocated for the control information in the entire RB may be divided by the amount of REs allocated for the control information among SC-FDMA symbols of a subcarrier. A rate value or a difference value between the two values n1 and n2 is calculated by rounding the divided result to the next greatest integer. The control information is rate-matched or is punctured using the rate value or the difference value. In other words, an interval in which the control information can be mapped is determined using the aforementioned rate value or difference value. Accordingly, the control information is multiplexed between specific locations of data in consideration of an interval in which the control information of a transport channel can be located. If the multiplexed information is sequentially mapped to the transport channel, the control information is distributively mapped in units of subcarriers over the entire RB. Locations of REs, within each RB, mapped in units of RBs may vary according to RBs.

In the mapping method, the multiplexed information is mapped starting from the first SC-FDMA symbol of the first subcarrier of the first RB in the direction of SC-FDMA symbols (i.e., according to time flow). If mapping of SC-FDMA symbols within one subcarrier is completed, mapping is sequentially performed for the next subcarriers. The mapping may be performed in a forward (namely, according to time flow), backward (namely, according to reverse time flow), or arbitrary order. Thus the data and the control information can be multiplexed. If the amount of the control information for multiplexing is greater than the amount of the control information which can be mapped in the transport channel, a mapping area of the control information can be extended up to symbols near to an RS. For example, even though the control information is permitted to be mapped only in the above-described first symbol period, if the amount of the control information is greater than the number of REs of the first symbol period, the control information can be mapped even to an area except for the first symbol period. Furthermore, the multiplexing/mapping method can be applied in consideration of extended area and extended amount. In the above description, the data, control information, and RE have been described in units of symbols. The number of bits denoted by each symbol should consider a modulation order.

Embodiment 3

Figure 6:
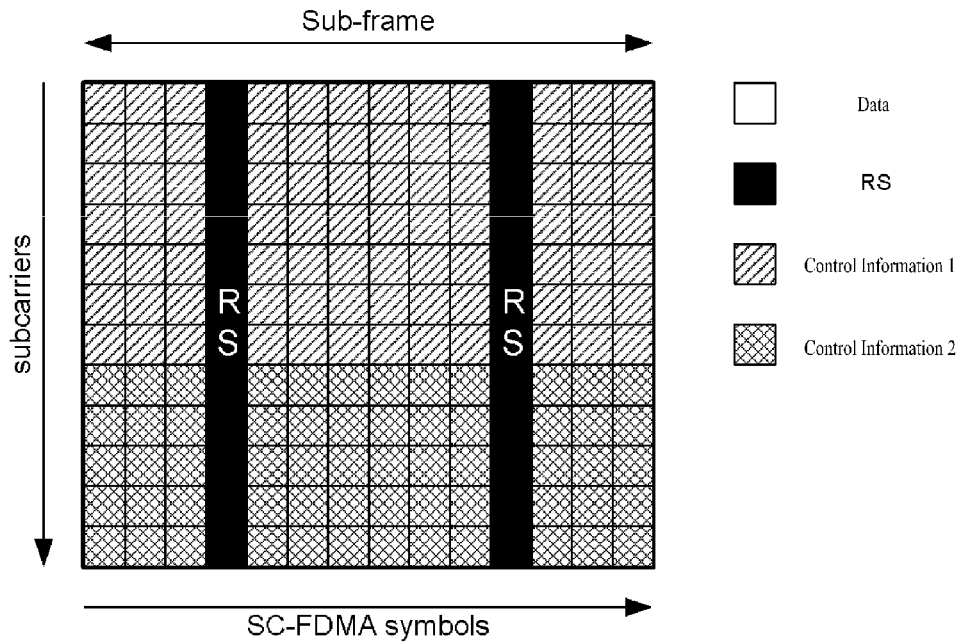
FIG. 6 is a view illustrating a control information mapping method according to a further exemplary embodiment of the present invention.

FIG. 6 illustrates a control information mapping method according to a further exemplary embodiment of the present invention.

In FIG. 6, if the sum of the amount of control information 1 and the amount of control information 2 is greater than the amount of transmissible REs, the amount of each control information mapped to one RB is reset such that a value obtained by dividing the amount of each control information by the number of SC-FDMA symbols can be 0. A result value obtained by dividing the amount of the control information 1 by the number of SC-FDMA symbols may be ceiled, floored, or rounded, so that {(amount of control information 1)=(number n1 of subcarriers)×(number of SC-FDMA symbols)}. Moreover, a result value obtained by dividing the amount of the control information 2 by the number of SC-FDMA symbols may be ceiled, floored, or rounded, so that {(amount of control information 2)=(number n2 of subcarriers)×(number of SC-FDMA symbols)}. In this case, (n1+n2) may be the same as the number of all subcarriers within one RB.

According to importance of the control information, ceil, floor, or round may be selectively applied. For example, if the control information 1 is more important than the control information 2, ceil may be used for the control information 1 and floor may be used for the control information 2, The amount of the control information can be adjusted using a rate-matching method, a specific bit repeating method, or encoding method. If the sum of the amount of the control information 1 and the amount of the control information 2 is greater than the amount of transmissive REs, the amount of control information can be adjusted according to importance thereof such that {(amount of control information 1)= (amount of transmissive REs)−(amount of control information 2)} or {(amount of control information 2)=(amount of transmissive REs)−(amount of control information 1)}.

Embodiment 4

Figure 7:
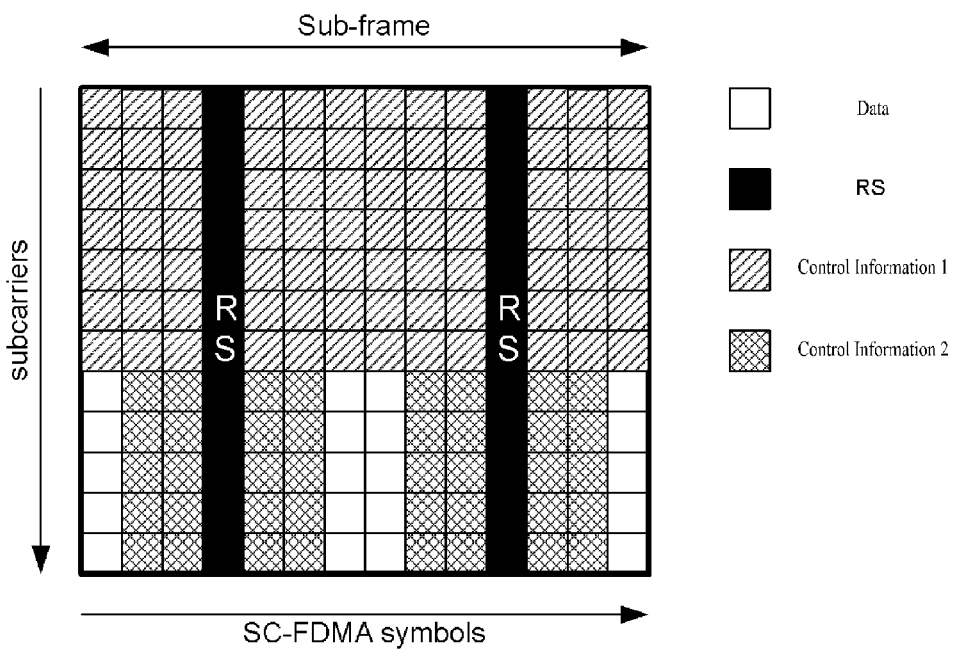
FIG. 7 is a view illustrating a control information mapping method according to another exemplary embodiment of the present invention.

FIG. 7 illustrates a control information mapping method according to another exemplary embodiment of the present invention.

To describe the embodiment of FIG. 7, the number of control information 1 is denoted by $N_{ci1}$, the number of control information 2 is denoted by $N_{ci2}$, the number of SC-FDMA symbols is denoted by $N_{SC\_sym}$, the number of subcarriers occupied by the control information 1 is denoted by $N_{sc\_ci1}$, and the number of all subcarriers is denoted by $N_{sc}$.

In FIG. 7, if a remainder obtained by dividing the number $N_{ci1}$ of control information 1 by the number $N_{SC\_sym}$ of SC-FDMA symbols is n(≠0), ($N_{SC\_sym}$−n) REs are filled with dummy information or data, thereby readjusting the number of control information 1. Therefore, the number $N_{sc\_ci1}$ of subcarriers occupied by the control information 1 is a value obtained by rounding a result of dividing $N_{ci1}$ by $N_{SC\_sym}$ to the next largest integer. Mapping is performed starting from the first RE of the first RB in the direction of SC-FDMA symbols. Hereinafter, the meaning of readjusting the number of control information may represent a method of increasing the length of the control information by adding dummy information or data or by copying a part of the control information, or decreasing the length of the control information by deleting a part of the control information.

The control information 2 may be mapped by the following method. First, a value n is calculated by rounding, to the next largest integer, a result of dividing the number $N_{ci1}$ of the control information 1 by the number $N_{SC\_sym}$ of the SC-FDMA symbols. Thereafter, the value n is subtracted from the number $N_{sc}$ of all subcarriers. Next, the number of the control information 2 that can be included per SC-FDMA symbol is calculated by dividing the number $N_{ci2}$ of the control information 2 by the above subtracted result. Then the control information 2 may be sequentially or distributively mapped to SC-FDMA symbols near to an RS according to the calculated result. The amount of the control information 2 may be reset to a multiple of a value obtained by rounding, to the next largest integer, a result of dividing the number $N_{ci2}$ of the control information 2 by the number of the control information that can be contained per SC-FDMA symbol. To this end, dummy information or other copied information may be added to the control information 2, or a part of the control information 2 may be eliminated. Alternatively, the number of the control information 2 may be set to the number of REs that have a remainder of 0 when divided by {(the number of subcarriers)×(the number of SC-FDMA symbols which can include the control information 2)}.

First, a value n is calculated by rounding, to the next largest integer, a result of dividing the number $N_{ci1}$ of the control information 1 by the number $N_{SC\_sym}$ of the SC-FDMA symbols. Thereafter, the number $N_{SC}$−n of subcarriers to which the control information 2 can be mapped is calculated by subtracting the value n from the number $N_{sc}$ of all subcarriers. The value $N_{SC}$−n is the number of control information 2 that can be included per SC-FDMA symbol. Then the control information 2 may be sequentially or distributively mapped to SC-FDMA symbols near to an RS. For instance, the control information 2 may be arranged in the first symbol period and/or the second symbol period. The amount of the control information 2 may be reset to a multiple of $N_{SC}$−n. For example, in FIG. 7, $N_{SC}$=12, n=7, $N_{SC}$−n=5, and $N_{ci2}$=($N_{SC}$−n)×8=40.

Embodiment 5

Figure 8:
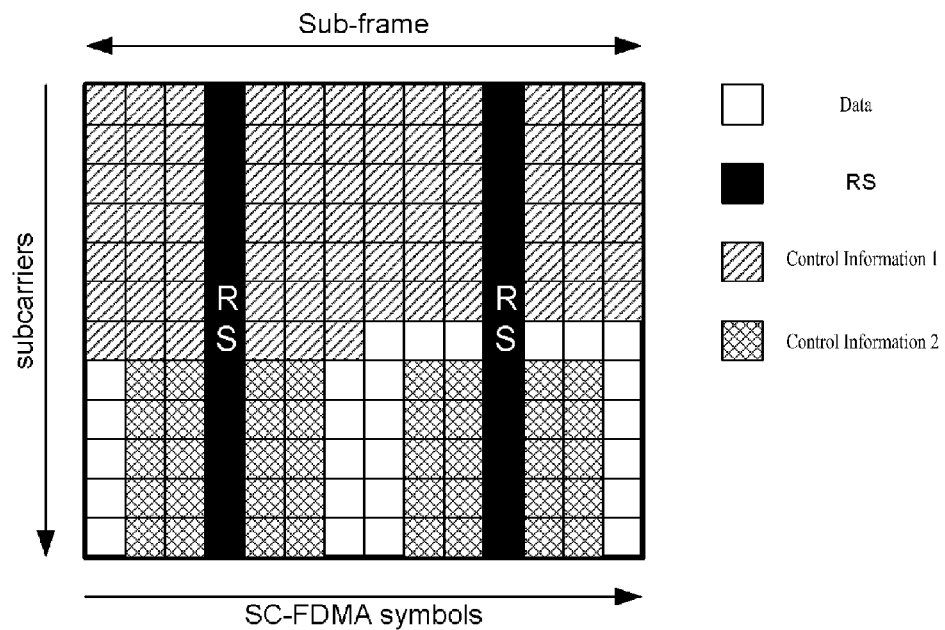
FIG. 8 is a view illustrating a control information mapping method according to another exemplary embodiment of the present invention.

FIG. 8 illustrates a control information mapping method according to another exemplary embodiment of the present invention.

In the mapping method of FIG. 8, control information 1 is mapped starting from the first SC-FDMA symbol of the first subcarrier of the first RB in the direction of SC-FDMA symbols (i.e., according to time flow). If mapping of SC-FDMA symbols within one subcarrier is completed, mapping is sequentially performed for the next subcarriers. The mapping may be performed in a forward (i.e., according to time flow), backward (i.e., according to reverse time flow), or arbitrary order.

According to the embodiment of FIG. 8, the amount of control information 2 is similarly determined to the method of FIG. 7. First, a value n is calculated by rounding, to the next largest integer, a result of dividing the number $N_{ci1}$ of the control information 1 by the number $N_{SC\_sym}$ of the SC-FDMA symbols. Thereafter, the value n is subtracted from the number $N_{sc}$ of subcarriers. Next, the number of the control information 2 that can be included per SC-FDMA symbol is calculated by dividing the number $N_{ci2}$ of the control information 2 by the above subtracted result. Then the control information 2 may be sequentially or distributively mapped to SC-FDMA symbols near to an RS according to the calculated result. The amount of the control information 2 may be reset to a multiple of a value obtained by rounding, to the next largest integer, a result of dividing the number $N_{ci2}$ of the control information 2 by the number of the control information that can be contained per SC-FDMA symbol. To this end, dummy information or other copied information may be added to the control information 2, or a part of the control information 2 may be eliminated. Alternatively, the number of the control information 2 may be set to the number of REs that have a remainder of 0 when divided by {(the number of subcarriers)×(the number of SC-FDMA symbols which can include the control information 2)}.

First, a value n is calculated by rounding, to the next largest integer, a result of dividing the number $N_{ci1}$ of the control information 1 by the number $N_{SC\_sym}$ of the SC-FDMA symbols. Thereafter, the number $N_{SC}$-n of subcarriers to which the control information 2 can be mapped is calculated by subtracting the value n from the number $N_{sc}$ of subcarriers. The value $N_{SC}$-n is the number of control information 2 that can be included per SC-FDMA symbol. Then the control information 2 may be sequentially or distributively mapped to SC-FDMA symbols near to an RS. For instance, the control information 2 may be arranged in the first symbol period and/or the second symbol period. The amount of the control information 2 may be reset to a multiple of $N_{SC}$-n. For example, in FIG. 8, $N_{SC}$=12, n=7, $N_{SC}$-5, and $N_{ci2}$=($N_{SC}$-n×8=40.

Embodiment 6

Figure 9:
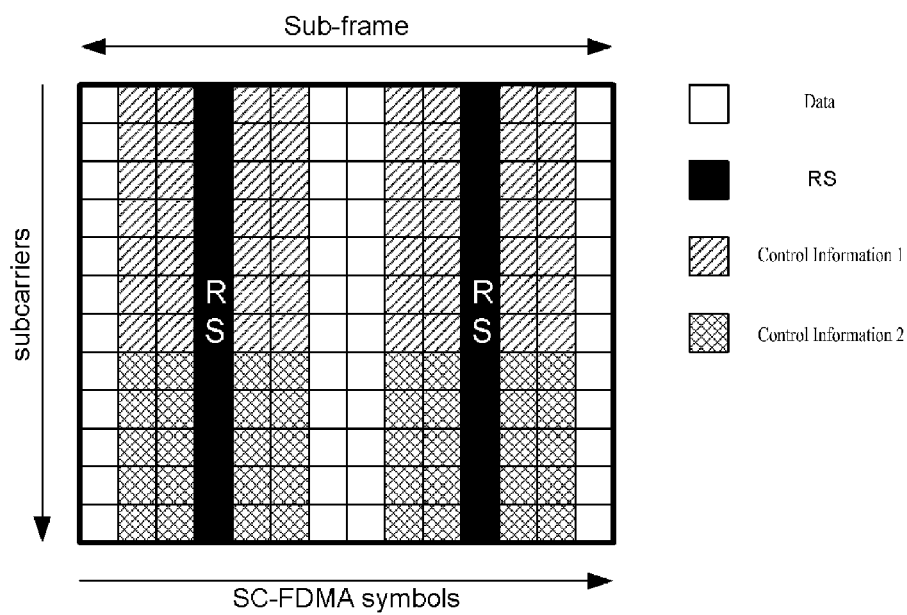
FIG. 9 is a view illustrating a control information mapping method according to another exemplary embodiment of the present invention.

FIG. 9 illustrates a control information mapping method according to another exemplary embodiment of the present invention.

In FIG. 9, the number of control information 1 may be reset to the number of REs having a remainder of 0 when divided by {(the number of subcarriers)×(the number of SC-FDMA symbols which can include the control information 1)}, using a value obtained by rounding up, to the next largest integer, a result of diving the number $N_{ci1}$ of the control information 1 by the number $N_{SC\_sym}$ of SC-FDMA. symbols. To this end, dummy information or other copied information may be added to the control information 1, or a part of the control information 1 may be eliminated. The control information 1 may be sequentially mapped within SC-FDMA symbols which can include the control information 1.

The number of control information 2 may be reset to a multiple of a value obtained by rounding up, to the next largest integer, a result of diving the number $N_{ci2}$ of the control information 2 by the number of the control information 2 which can be included per SC-FDMA symbol, in consideration of the number of the control information 1 and the number $N_{ci2}$ of the control information 2. To this end, dummy information or other copied information may be added to the control information 2, or a part of the control information 2 may be eliminated. The number of control information 2 may be reset to the number of REs having a remainder of 0 when divided by {(the number of subcarriers)×(the number of SC-FDMA symbols which can include the control information 2)}. The control information 2 may be sequentially or distributively arranged in the SC-FDMA symbols excluding the location of the control information 1.

For example, the number of subcarriers mapped to the control information 1 is determined by a value n obtained by rounding, to the next largest integer, a result of dividing the number $N_{ci1}$ of the control information 1 by the number $N_{SC\_sym}$ of the SC-FDMA symbols. The value n is the number of control information 1 that can be included per SC-FDMA symbol. Then the control information 1 may be sequentially or distributively mapped to SC-FDMA. symbols near to an RS. For example, the control information 1 may be arranged in the first symbol period and/or the second symbol period. In this case, the amount of the control information 1 may be reset to a multiple of n.

A value is calculated by rounding, to the next largest integer, a result of dividing the number $N_{ci1}$ of the control information 1 by the number $N_{SC\_sym}$ of the SC-FDMA symbols. The number $N_{SC}$-n of subcarriers to which the control information 2 can be mapped is obtained by subtracting the value from the total number of subcarriers $N_{SC}$. The value $N_{SC}$-n is the number of control information 2 that can be included per SC-FDMA symbol. Then the control information 2 may be sequentially or distributively mapped to SC-FDMA symbols near to an RS. For instance, the control information 2 may be arranged in the first symbol period and/or the second symbol period. The amount of the control information 2 may be reset to a multiple of $N_{SC}$-n. For example, in FIG. 9, $N_{SC}$=12, n=7, $N_{SC}$-n=5, $N_{ci1}$=n× 8=56, and $N_{ci2}$=($N_{SC}$=n)×8=40.

Embodiment 7

Figure 10:
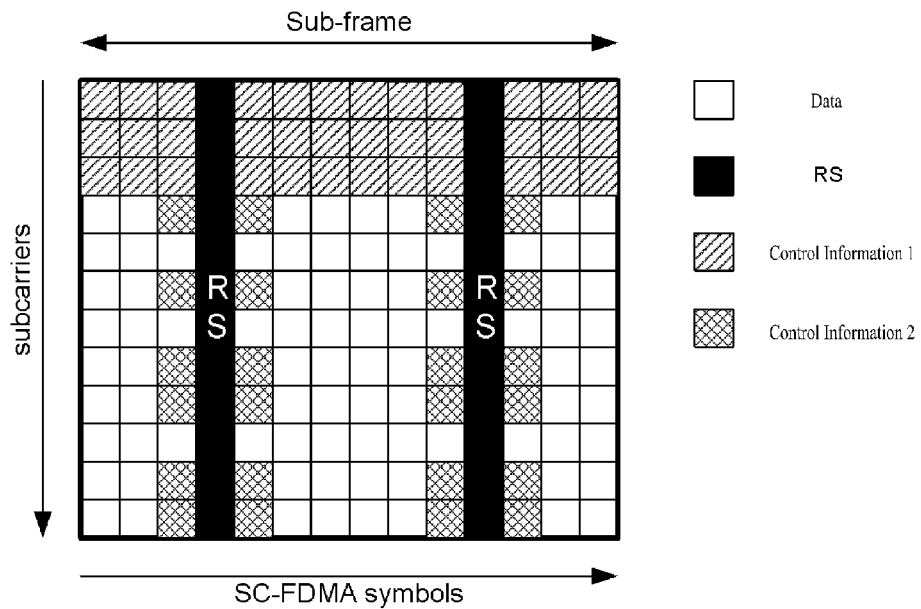
FIG. 10 is a view illustrating a control information mapping method according to another exemplary embodiment of the present invention.

FIG. 10 illustrates a control information mapping method according to another exemplary embodiment of the present invention.

In FIG. 10, control information 1 is sequentially mapped in the direction of a time axis (SC-FDMA symbols). The number and locations of SC-FDMA symbols to which control information 2 can be mapped among SC-FDMA symbols near to an RS are determined so that the control information 2 is distributively mapped to REs of locations corresponding to the determined SC-FDMA symbols. The locations in which the control information 2 can be mapped may be the above-described first symbol period and/or second symbol period.

To determine the size and location of an area in which the control information 1 is mapped, a result value obtained by dividing the amount of the control information 1 considering a modulation order by the number of SC-FDMA symbols may ceiled, floored, rounded, or divided. The size of an area in which the control information 1 is mapped can be set to a number of the unit of REs or subcarriers based on the calculated value.

To determine the size and location of an area in which the control information 2 is mapped, a result value obtained by dividing the number of symbols of the control information 1 and control information 2 considering a modulation order by the number of SC-FDMA symbols may ceiled, floored, rounded, or divided. The numbers of REs or subcarriers to which the control information 2 is mapped can be obtained based on the calculated value.

The number of the control information 2 which can be included per SC-FDMA symbol should be determined in consideration of the number of the control information 1 included in a corresponding SC-FDMA symbol.

According to the above-described method, the control information 1 is sequentially mapped in the direction of a time axis and the control information 2 can be mapped to REs near to the RS. Since the control information 2 is distributively mapped, a code rate of all code blocks can be uniformly maintained.

If only the control information 1 and data are multiplexed, the above-described method may be used without considering the location of the control information 2. If only the control information 2 and data are multiplexed, the above-described method may be used to obtain an area and location in which the control information 2 is mapped in an entire transmission band without considering the location of the control information 1.

Embodiment 8

Figure 11:
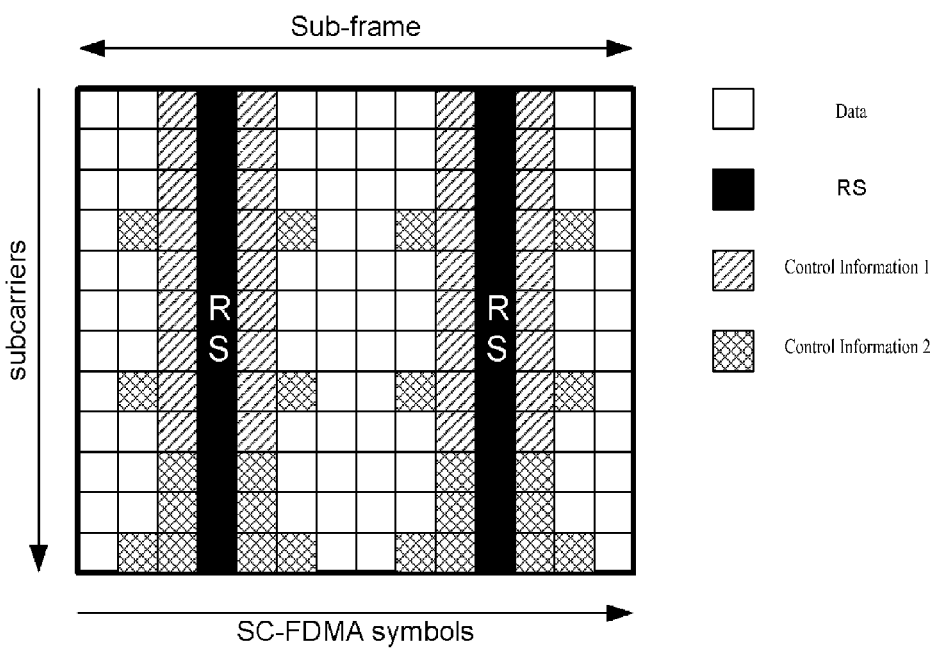
FIG. 11 is a view illustrating a control information mapping method according to another exemplary embodiment of the present invention.

FIG. 11 illustrates a control information mapping method according to another exemplary embodiment of the present invention.

In FIG. 11, the number and locations of SC-FDMA symbols to which control information 1 can be mapped among SC-FDMA symbols near to an RS are determined. The control information 1 is sequentially mapped to REs of the determined locations. The number and locations of SC-FDMA symbols to which control information 2 can be mapped among SC-FDMA symbols near to an RS are determined. The control information 2 is distributively mapped to REs of locations corresponding to the determined SC-FDMA symbols.

For example, the control information 1 is mapped to the first symbol period. If the mapping of the control information 1 is ended, the control information 2 is mapped to the remaining REs in the first symbol period. If the control information 2 is not all mapped to the first symbol period, the control information 2 which are not mapped may be mapped to an area except for the first symbol period, for example, to the second symbol period. The number of REs of the second symbol period is compared with the number of the remaining control information 2 to distributively map the remaining control information 2 to the second symbol period.

To determine the size and location of an area in which the control information 1 is mapped, a result value obtained by dividing the number of the control information 1 considering a modulation order by the number of SC-FDMA symbols may ceiled, floored, rounded, or divided, thereby calculating the number of REs or subcarriers in which the control information 1 can be located. To determine the size and location of an area in which the control information 2 is mapped, a result value obtained by dividing the number of symbols of the control information 1 and control information 2 considering a modulation order by the number of SC-FDMA symbols may ceiled, floored, rounded, or divided, thereby calculating the number of REs or subcarriers in which the control information 2 can be located. Since a range of the control information 1 may differ in the SC-FDMA symbols (horizontal axis), the number of the control information 1 should be considered when determining the location of the control information 2. The number and/or location of the control information 2 which can be included per SC-FDMA symbol are determined considering the number and/or location of the control information 1 included in a corresponding SC-FDMA symbol. If only the control information 1 and data are multiplexed, the above-described method may be used without considering the location of the control information 2. If only the control information 2 and data are multiplexed, the above-described method may be used to obtain an area and location in which the control information 2 is mapped without considering the location of the control information 1. Therefore, the control information can be mapped to REs near to the RS and a code rate of all code blocks can be uniformly maintained by distributing the control information 2.

The embodiments of the present invention described above have the following effects. The method for multiplexing the control information and data and mapping the multiplexed information to the transport channel may use the same multiplexing rule irrespective of the presence/absence, amount, and type of the control information and does not influence transmission of other data of a cyclic buffer. A start point of the cyclic buffer for the next redundancy version is not influenced by the method and HARQ buffer corruption can be avoided in a HARQ transmission scheme. The control information can be located in symbols near to the RS and can be distributed over the entire RB. Therefore, during multiplexing and mapping of the data and control information, the control information is gathered in a specific RB according to the amount of the control information, so a variation in a data code rate of the specific RB is distributed over the entire RB. As a result, an error rate in a code block can be equalized.

Other exemplary embodiments of the present invention will now be described in detail.

Figure 2:
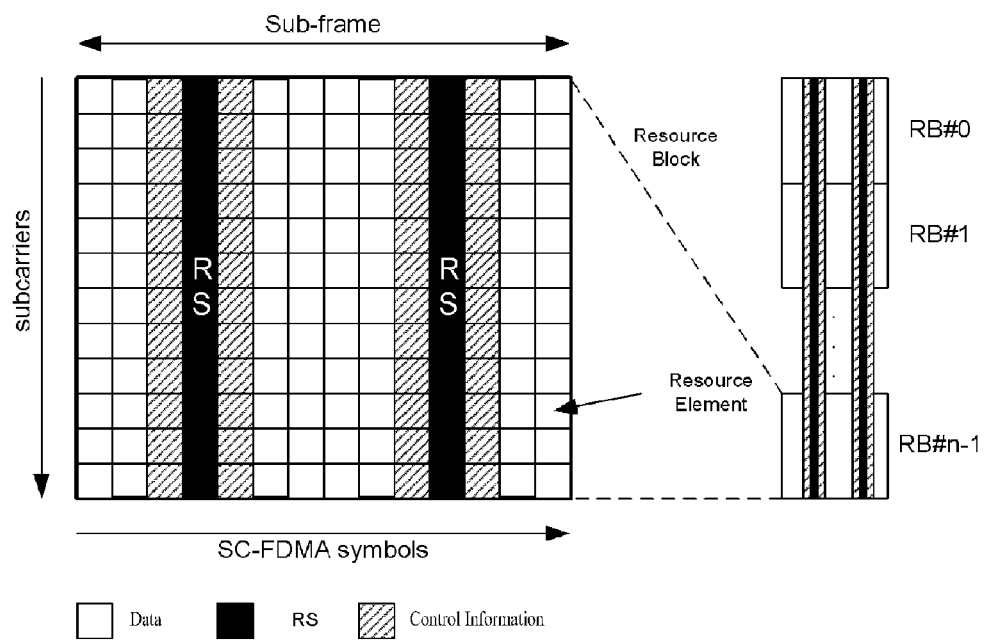
FIG. 2 illustrates conventional transport channel processing.

Table 2 illustrates the method of FIG. 2 and shows an example of applying a method for inserting control information to a 3GPP TS 36.212 V8.0.0.

TABLE 2 set $N_{symb}^{UL-SCH} = 2 \cdot (N_{symb}^{UL} - 1)$
set i, j, k to 0
set e = no_re
set ep = no_re
set em = no_re − no_ci
for k=0 to H-1
   if k mod $N_{symb}^{UL-SCH}$ = 2 or 3 or ($N_{symb}^{UL-SCH}/2+2$) or ($N_{symb}^{UL-SCH}/2+3$)
     e = e − em
     if (e <= 0)
        $g_k = f_i$
        e = e + ep
        i++
        k++
     else
        $g_k = q_j$
        j++
        k++
     end if
   else
     $g_k = f_i$
     i++
     k++
   end if
end for Here, $f_1, f_2, f_3, \ldots f_{G-1}$ denote inputs, G is the amount of data excluding the amount of control information, $g_0, g_1, g_2, \ldots, g_{H-1}$ denote outputs, H denotes the sum of the amount of data and the amount of control information, $q_0, q_1, q_2, \ldots, q_{Q-1}$ denote control information, and Q denotes the amount of control information.

According to the method of Table 2, the number of SC-FDMA symbols located in one subcarrier in a transmission unit is given by $N_{symb}^{UL-SCH}=2 \cdot (N_{symb}^{UL}-1)$. Parameters for rate-matching are initialized using the amount of REs and the amount of the control information. In the multiplexing method of Table 2, a multiplexing operation is repeated H times using a parameter k. Input data is allocated in an area except for a control information mapping area.

The data or control information is allocated to the control information mapping area through rate-matching. The control information mapping area is calculated by k mod $N_{symb}^{L-SCH}=2$ or 3 or $(N_{symb}^{UL-SCH}/2+2)$ or $(N_{symb}^{UL-SCH}/2+3)$ operation. Here, k may be 2, 3, 8, or 9 and k may be a specific number. In this embodiment, the multiplexing method is expressed in a symbol unit and may be applied considering bits and a modulation order.

Table 3 illustrates the method of FIG. 2 and shows an example of applying a method for inserting different types of control information or a method for replacing data by control information to a 3GPP TS 36.212 V8.0.0.

TABLE 3

```
set N_symb^UL-SCH = 2 · (N_symb^UL −1)
set i, j, k to 0
set e = no_re
set ep = no_re
set em = no_re − no_ci
for k=0 to H-1
    if k mod N_symb^UL-SCH = 2 or 3 or (N_symb^UL-SCH/2+2) or (N_symb^UL-SCH/2+3)
        e = e − em
        if (e <= 0)
            g_k = f_i
            e = e + ep
            i++
            k++
        else
            if (rate matching case)
                g_k = q_j
                j++
                k++
            else ; puncturing case
                g_k = q_j
                j++
                k++
                i++
        end if
    else
        g_k = f_i
        i++
        k++
    end if
end for
```

Control information q is formed by equally or unequally control information which is to puncture rate-matched control information and data. It is assumed that information about locations to be inserted or replaced can be known. Here, $f_1, f_2, f_3, \ldots, f_{G-1}$ denote inputs, G is the amount of data excluding the amount of control information, $g_0, g_1, g_2, \ldots, g_{H-1}$ denote outputs, H denotes the sum of the amount of data and the amount of control information, $q_0, q_1, q_2, \ldots, q_{Q-1}$ denote control information, and Q denotes the amount of control information. According to the method of Table 3, the number of SC-FDMA symbols located in one subcarrier in a transmission unit is given by $N_{symb}^{UL-SCH}=2\cdot(N_{symb}^{UL}-1)$. Parameters for rate-matching are initialized using the amount of REs and the amount of the control information. In the multiplexing method of Table 3, an operation for multiplexing is repeated H times using a parameter k. Input data is allocated in an area except for a control information mapping area. The data or control information is allocated to the control information mapping area through rate-matching. The control information mapping area is calculated by k mod $N_{symb}^{UL-SCH}=2$ or 3 or $(N_{symb}^{UL-SCH}/2+2)$ or $(N_{symb}^{UL-SCH}/2+3)$ operation. Here, k may be 2, 3, 8, or 9 and k may be a specific number. When control information is rate-matched, the control information is inserted between data. If the control information punctures the data, the control information can replace the data in a manner of increasing count of data by the size of control information to be inserted for replacement (in consideration of a modulation order). In this embodiment, the multiplexing method is expressed in a symbol unit and may be applied considering bits and a modulation order.

Hereinafter, an embodiment of applying the method of FIG. 8 to 3GPP TS 36.212 V8.1.0 will be described.

$f_0, f_1, f_2, \ldots, f_{G-1}$ denotes input data, $q_0, q_1, q_2, \ldots, q_{Q-1}$ denotes inserted (rate-matching scheme) input control information, $s_0, s_1, s_2, \ldots, s_{S-1}$ denotes punctured input control information, $g_0, g_1, g_2, \ldots, g_{H'-1}$ denotes a multiplexed output. Here, H'=G'+Q'. $N_{symb}^{PUSCH}=(2\cdot(N_{symb}^{UL}-1)-N_{SRS})$ denotes the number of SC-FDMA symbols per subframe for PUSCH transmission. The number of modulation symbols per SC-FDMA symbol for PUSCH transmission is set to Rmux=H'/$N_{symb}^{PUSCH}$. The number of available symbols per SC-FDMA symbol for PUSCH transmission is set to R'mux=Rmux ... $\lceil Q'/N_{symb}^{PUSCH}\rceil$. The number of SC-FDMA symbols including punctured control information is given as follows.

$$N_{symb}^{nec} = \begin{cases} 0 & \text{if } S' = 0 \\ 0 & \text{if } 0 < \lceil S'/R'_{mux}\rceil \leq 4 \\ 4 & \text{if } 4 < \lceil S'/R'_{mux}\rceil \leq 8 \\ 8 & \text{if } \lceil S'/R'_{mux}\rceil > 8 \end{cases}$$

Therefore, the number of SC-FDMA symbols including punctured control information is given as follows.
$N_{symb}^{ULcontrol}=N_{symb}^{nec}+N_{symb}^{comp}$ Table 4 illustrates parameters indicating puncturing locations of control information for puncturing.

TABLE 4

| es | ei | ep | em |
|---|---|---|---|
| Rmux − R' mux | R' mux | R' mux | $\lceil (S' - N_{symb}^{nec} * R' mux)/N_{symb}^{comp}\rceil$ |

$n1_i$ denotes the number of control information modulation symbols (for puncturing) within an i-th SC-FDMA symbol transmitting a PUSCH within a subframe, and $n2i$ denotes control information modulation locations (for puncturing) within an i-th SC-FDMA. symbol transmitting a PUSCH within a subframe.

The number of control modulation symbols mapped to respective SC-FDMA symbols transmitting a PUSCH for a subframe having a normal CP is illustrated in Table 5 to Table 13.

Table 5 illustrates $n1_i$ and $n2_i$ when $N_{symb}^{ULcontrol}=4$ in a normal CP subframe without an SRS.

Table 6 illustrates $n1_i$ and $n2i$ when $N_{symb}^{ULcontrol}=4$ in a normal CP subframe with an SRS in the last symbol.

Table 7 illustrates $n1_i$ and $n2i$ when $N_{symb}^{ULcontrol}=4$ in a normal CP subframe with an SRS in the first symbol.

Table 8 illustrates $n1_i$ and $n2_i$ when $N_{symb}^{ULcontrol}=8$ in a normal CP subframe without an SRS.

Table 9 illustrates $n1_i$ and $n2_i$ when $N_{symb}^{ULcontrol}=8$ in a normal CP subframe with an SRS in the last symbol.

Table 10 illustrates $n1_i$ and $n2_i$ when $N_{symb}^{ULcontrol}=8$ in a normal CP subframe with an SRS in the first symbol.

Table 11 illustrates $n1_i$ and $n2_i$ when $N_{symb}^{ULcontrol}=N_{symb}^{PUSCH}$ in a normal CP subframe without an SRS.

Table 12 illustrates $n1_i$ and $n2_i$ when $N_{symb}^{ULcontrol}=N_{symb}^{PUSCH}$ in a normal CP subframe with an SRS in the last symbol.

Table 13 illustrates $n1_i$ and $n2_i$ when $N_{symb}^{ULcontrol}=N_{symb}^{PUSCH}$ in a normal CP subframe with an SRS in the first symbol.

TABLE 5

| i | 0 | 1 | 2 | 3 | 4 | 5 | 6 | 7 | 8 | 9 | 10 | 11 |
|---|---|---|---|---|---|---|---|---|---|---|----|----|
| n1 | 0 | 0 | $\lfloor \lceil S'/2 \rceil /2 \rfloor$ | $\lceil \lceil S'/2 \rceil /2 \rceil$ | 0 | 0 | 0 | 0 | $\lceil \lfloor S'/2 \rfloor /2 \rceil$ | $\lfloor \lfloor S'/2 \rfloor /2 \rfloor$ | 0 | 0 |
| n2 | 0 | 0 | 0 | 0 | 0 | 0 | 0 | 0 | 0 | 0 | 0 | 0 |

TABLE 6

| i | 0 | 1 | 2 | 3 | 4 | 5 | 6 | 7 | 8 | 9 | 10 |
|---|---|---|---|---|---|---|---|---|---|---|----|
| n1 | 0 | 0 | $\lfloor \lceil S'/2 \rceil /2 \rfloor$ | $\lceil \lceil S'/2 \rceil /2 \rceil$ | 0 | 0 | 0 | 0 | $\lceil \lfloor S'/2 \rfloor /2 \rceil$ | $\lfloor \lfloor S'/2 \rfloor /2 \rfloor$ | 0 |
| n2 | 0 | 0 | 0 | 0 | 0 | 0 | 0 | 0 | 0 | 0 | 0 |

TABLE 7

| i | 0 | 1 | 2 | 3 | 4 | 5 | 6 | 7 | 8 | 9 | 10 |
|---|---|---|---|---|---|---|---|---|---|---|----|
| n1 | 0 | $\lfloor \lceil S'/2 \rceil /2 \rfloor$ | $\lceil \lceil S'/2 \rceil /2 \rceil$ | 0 | 0 | 0 | 0 | $\lceil \lfloor S'/2 \rfloor /2 \rceil$ | $\lfloor \lfloor S'/2 \rfloor /2 \rfloor$ | 0 | 0 |
| n2 | 0 | 0 | 0 | 0 | 0 | 0 | 0 | 0 | 0 | 0 | 0 |

TABLE 8

| I | 0 | 1 | 2 | 3 | 4 | 5 |
|---|---|---|---|---|---|---|
| N1 | 0 | $\lfloor \lceil (S'-4*R'mux)/2 \rceil /2 \rfloor$ | R'mux | R'mux | $\lceil \lceil (S'-4*R'mux)/2 \rceil /2 \rceil$ | 0 |
| N2 | 0 | 0 | 1 | 1 | 0 | 0 |

TABLE 8-continued

| I | 6 | 7 | 8 | 9 | 10 | 11 |
|---|---|---|---|---|----|----|
| N1 | 0 | $\lceil \lfloor (S'-4*R'mux)/2 \rfloor /2 \rceil$ | R'mux | R'mux | $\lfloor \lfloor (S'-4*R'mux)/2 \rfloor /2 \rfloor$ | 0 |
| N2 | 0 | 0 | 1 | 1 | 0 | 0 |

TABLE 9

| i | 0 | 1 | 2 | 3 | 4 | 5 |
|---|---|---|---|---|---|---|
| N1 | 0 | $\lfloor \lceil (S'-4*R'mux)/2 \rceil /2 \rfloor$ | R'mux | R'mux | $\lceil \lceil (S'-4*R'mux)/2 \rceil /2 \rceil$ | 0 |
| N2 | 0 | 0 | 1 | 1 | 0 | 0 |

| i | 6 | 7 | 8 | 9 | 10 |
|---|---|---|---|---|----|
| N1 | 0 | $\lceil \lfloor (S'-4*R'mux)/2 \rfloor /2 \rceil$ | R'mux | R'mux | $\lfloor \lfloor (S'-4*R'mux)/2 \rfloor /2 \rfloor$ |
| N2 | 0 | 0 | 1 | 1 | 0 |

TABLE 10

| I | 0 | 1 | 2 | 3 | 4 |
|---|---|---|---|---|---|
| N1 | $\lfloor \lceil (S'-4*R'mux)/2 \rceil /2 \rfloor$ | R'mux | R'mux | $\lceil \lceil (S'-4*R'mux)/2 \rceil /2 \rceil$ | 0 |
| N2 | 0 | 1 | 1 | 0 | 0 |

| I | 5 | 6 | 7 | 8 | 9 | 10 |
|---|---|---|---|---|---|----|
| N1 | 0 | $\lceil \lfloor (S'-4*R'mux)/2 \rfloor /2 \rceil$ | R'mux | R'mux | $\lfloor \lfloor (S'-4*R'mux)/2 \rfloor /2 \rfloor$ | 0 |
| N2 | 0 | 0 | 1 | 1 | 0 | 0 |

TABLE 11

| i | 0 | 1 | 2 | 3 | 4 | 5 |
|---|---|---|---|---|---|---|
| n1 | $\lfloor \lceil (S' - 8 * R'mux)/2 \rceil /2 \rfloor$ | R'mux | R'mux | R'mux | R'mux | $\lceil \lceil (S' - 8 * R'mux)/2 \rceil /2 \rceil$ |
| n2 | 0 | 1 | 1 | 1 | 1 | 0 |

| i | 6 | 7 | 8 | 9 | 10 | 11 |
|---|---|---|---|---|----|----|
| n1 | $\lceil \lfloor (S' - 8 * R'mux)/2 \rfloor /2 \rceil$ | R'mux | R'mux | R'mux | R'mux | $\lfloor \lfloor (S' - 8 * R'mux)/2 \rfloor /2 \rfloor$ |
| n2 | 0 | 1 | 1 | 1 | 1 | 0 |

TABLE 12

| I | 0 | 1 | 2 | 3 | 4 | 5 |
|---|---|---|---|---|---|---|
| n1 | $\lfloor (S' - 8 * R'mux)/3 \rfloor$ | R'mux | R'mux | R'mux | R'mux | $\lceil (S' - 8 * R'mux)/3 \rceil$ |
| n2 | 0 | 1 | 1 | 1 | 1 | 0 |

| I | 6 | 7 | 8 | 9 | 10 |
|---|---|---|---|---|----|
| n1 | $\lfloor (S' - 8 * R'mux)/3 + 0.5 \rfloor$ | R'mux | R'mux | R'mux | R'mux |
| n2 | 0 | 1 | 1 | 1 | 1 |

TABLE 13

| I | 0 | 1 | 2 | 3 | 4 |
|---|---|---|---|---|---|
| n1 | R'mux | R'mux | R'mux | R'mux | $\lceil (S' - 8 * R'mux)/3 \rceil$ |
| n2 | 1 | 1 | 1 | 1 | 0 |

TABLE 13-continued

| i | 5 | 6 | 7 | 8 | 9 | 10 |
|---|---|---|---|---|---|---|
| ni | $\lfloor (S' - 8 * R'mux)/3 + 0.5 \rfloor$ | R'mux | R'mux | R'mux | R'mux | $\lfloor (S' - 8 * R'mux)/3 \rfloor$ |
| n2 | 0 | 1 | 1 | 1 | 1 | 0 |

The number of control modulation symbols mapped to respective SC-FDMA symbols transmitting a PUSCH for a subframe having an extended CP is illustrated in Table 14 to Table 22.

Table 14 illustrates $n1_i$ and $n2_i$ when $N_{symb}^{ULcontrol}=4$ in an extended CP subframe without an SRS.

Table 15 illustrates $n1_i$ and $n2_i$ when $N_{symb}^{ULcontrol}=4$ in an extended CP subframe with an SRS in the last symbol.

Table 16 illustrates $n1_i$ and $n2i$ when $N_{symb}^{ULcontrol}=4$ in an extended CP subframe with an SRS in the first symbol.

Table 17 illustrates $n1_i$ and $n2_i$ when $N_{symb}^{ULcontrol}=8$ in an extended CP subframe without an SRS.

Table 18 illustrates $n1_i$ and $n2_i$ when $N_{symb}^{ULcontrol}=8$ in an extended CP subframe with an SRS in the last symbol.

Table 19 illustrates $n1_i$ and $n2i$ when $N_{symb}^{ULcontrol}=8$ in an extended CP subframe with an SRS in the first symbol.

Table 20 illustrates $1_i$ and $n2i$ when $N_{symb}^{ULcontrol}=N_{symb}^{PUSCH}$ in an extended CP subframe without an SRS, Table 21 illustrates $1_i$ and $n2i$ when $N_{symb}^{ULcontrol}=N_{symb}^{PUSCH}$ in an extended CP subframe with an SRS in the last symbol.

Table 22 illustrates $1_i$ and $n2i$ when $N_{symb}^{ULcontrol}=N_{symb}^{PUSCH}$ in an extended CP subframe with an SRS in the first symbol.

TABLE 14

| i | 0 | 1 | 2 | 3 | 4 | 5 | 6 | 7 | 8 | 9 |
|---|---|---|---|---|---|---|---|---|---|---|
| n1 | 0 | 0 | $\lfloor \lceil S'/2 \rceil /2 \rfloor$ | $\lceil \lceil S'/2 \rceil /2 \rceil$ | 0 | 0 | 0 | $\lceil \lfloor S'/2 \rfloor /2 \rceil$ | $\lfloor \lfloor S'/2 \rfloor /2 \rfloor$ | 0 |
| n2 | 0 | 0 | 0 | 0 | 0 | 0 | 0 | 0 | 0 | 0 |

TABLE 15

| i | 0 | 1 | 2 | 3 | 4 | 5 | 6 | 7 | 8 |
|---|---|---|---|---|---|---|---|---|---|
| n1 | 0 | 0 | $\lfloor \lceil S'/2 \rceil /2 \rfloor$ | $\lceil \lceil S'/2 \rceil /2 \rceil$ | 0 | 0 | 0 | $\lceil \lfloor S'/2 \rfloor /2 \rceil$ | $\lfloor \lfloor S'/2 \rfloor /2 \rfloor$ |
| n2 | 0 | 0 | 0 | 0 | 0 | 0 | 0 | 0 | 0 |

TABLE 16

| i | 0 | 1 | 2 | 3 | 4 | 5 | 6 | 7 | 8 |
|---|---|---|---|---|---|---|---|---|---|
| n1 | 0 | $\lfloor \lceil S'/2 \rceil /2 \rfloor$ | $\lceil \lceil S'/2 \rceil /2 \rceil$ | 0 | 0 | 0 | $\lceil \lfloor S'/2 \rfloor /2 \rceil$ | $\lfloor \lfloor S'/2 \rfloor /2 \rfloor$ | 0 |
| n2 | 0 | 0 | 0 | 0 | 0 | 0 | 0 | 0 | 0 |

TABLE 17

| i | 0 | 1 | 2 | 3 | 4 |
|---|---|---|---|---|---|
| n1 | 0 | $\lfloor \lceil (S' - 4 * R' mux)/2 \rceil /2 \rfloor$ | R' mux | R' mux | $\lceil \lceil (S' - 4 * R' mux)/2 \rceil /2 \rceil$ |
| n2 | 0 | 0 | 1 | 1 | 0 |

TABLE 17-continued

| i | 5 | 6 | 7 | 8 | 9 |
|---|---|---|---|---|---|
| n1 | 0 | $\lceil \lfloor (S' - 4 * R' mux)/2 \rfloor /2 \rceil$ | R' mux | R' mux | $\lfloor \lfloor (S' - 4 * R' mux)/2 \rfloor /2 \rfloor$ |
| n2 | 0 | 0 | 1 | 1 | 0 |

TABLE 18

| i | 0 | 1 | 2 | 3 | 4 |
|---|---|---|---|---|---|
| n1 | 0 | $\lfloor \lceil (S' - 4 * R' mux)/2 \rceil /2 \rfloor$ | R' mux | R' mux | $\lceil \lceil S' - 4 * R' mux)/2 \rceil /2 \rceil$ |
| n2 | 0 | 0 | 1 | 1 | 0 |

| i | 5 | 6 | 7 | 8 |
|---|---|---|---|---|
| n1 | $\lfloor \lceil (S' - 4 * R' mux)/2 \rceil /2 \rfloor$ | $\lceil \lfloor (S' - 4 * R' mux)/2 \rfloor /2 \rceil$ | R' mux | R' mux |
| n2 | 0 | 0 | 1 | 1 |

TABLE 19

| i | 0 | 1 | 2 | 3 |
|---|---|---|---|---|
| n1 | $\lfloor \lceil (S' - 4 * R' mux)/2 \rceil /2 \rfloor$ | R' mux | R' mux | $\lceil \lceil (S' - 4 * R' mux/2 \rceil /2 \rceil$ |
| n2 | 0 | 1 | 1 | 0 |

| i | 4 | 5 | 6 | 7 | 8 |
|---|---|---|---|---|---|
| n1 | 0 | $\lceil \lfloor (S' - 4 * R' mux)/2 \rfloor /2 \rceil$ | R' mux | R' mux | $\lfloor \lfloor (S' - 4 * R' mux)/2 \rfloor /2 \rfloor$ |
| n2 | 0 | 0 | 1 | 1 | 0 |

TABLE 20

| i | 0 | 1 | 2 | 3 | 4 |
|---|---|---|---|---|---|
| n1 | $\lfloor (S' - 8 * R' mux)/2 \rfloor$ | R' mux | R' mux | R' mux | R' mux |
| n2 | 0 | 1 | 1 | 1 | 1 |

| i | 5 | 6 | 7 | 8 | 9 |
|---|---|---|---|---|---|
| n1 | $\lceil (S' - 8 * R' mux)/2 \rceil$ | R' mux | R' mux | R' mux | R' mux |
| n2 | 0 | 1 | 1 | 1 | 1 |

TABLE 21

| i | 0 | 1 | 2 | 3 | 4 | 5 | 6 | 7 | 8 |
|---|---|---|---|---|---|---|---|---|---|
| n1 | S' − 8 * R'mux | R'mux | R'mux | R'mux | R'mux | R'mux | R'max | R'mux | R'mux |
| n2 | 0 | 1 | 1 | 1 | 1 | 1 | 1 | 1 | 1 |

TABLE 22

| i | 0 | 1 | 2 | 3 | 4 | 5 | 6 | 7 | 8 |
|---|---|---|---|---|---|---|---|---|---|
| n1 | R'mux | R'mux | R'mux | R'mux | S' − 8 * R'mux | R'mux | R'mux | R'mux | R'mux |
| n2 | 1 | 1 | 1 | 1 | 0 | 1 | 1 | 1 | 1 |

The control information and data may be multiplexed as follows.

```
Set i to 0
Set temp to S'
Set e to ei
for (m = 0; m < Rmux ; m++)
    if (m < es)
        for (i = 0; i < N_symb^PUSCH ; i++)
            if (temp > 0)
                insert control information (insert)
                increase control information (insert) index
                temp--
            else
                insert data
                increase data index
            end if
            increase output index
        end for
    else
        e = e − em
        if (e <= 0)
            for (i = 0; i < N_symb^PUSCH ; i++)
                if (n1[i] > 0)
                    puncture data
                    increase control information (puncturing) index
                    increase data index
                    n1[i]--
                else
                    insert data
                    increase data index
                end if
                increase output index
            end for
            e = e + ep
        else
            for (i = 0; i < N_symb^PUSCH ; i++)
                if (n2[i] == 1)
                    puncture data
                    increase control information (puncturing) index
                    increase data index
                    n1[i]--
                else
                    insert data
                    increase data index
                end if
                increase output index
            end for
        end if
    end if
end for
```

Hereinafter, an embodiment of applying the method of FIG. 9 to 3GPP TS 36.212 V8.1.0 will be described.

$f_0, f_1, f_2, \ldots, f_{G-1}$ denotes input data, $q_0, q_1, q_2, \ldots, q_{Q-1}$ denotes inserted (rate-matching scheme) input control information, $s_0, s_1, s_2, \ldots, s_{S-1}$ denotes punctured input control information, $g_0, g_1, g_2, \ldots, g_{H-1}$ denotes a multiplexed output. Here, $H'=G'+Q'$. $N_{symb}^{PUSCH}=(2\cap(N_{symb}^{UL}-1)-N_{SRS})$ denotes the number of SC-FDMA symbols per subframe for PUSCH transmission. The number of modulation symbols per SC-FDMA symbol for PUSCH transmission is set to $R_{mux}=H'/N_{symb}^{PUSCH}$.

The number of SC-FDMA symbols including inserted control information is given as follows.

$$N_{symb}^{UL\,control1} = \begin{cases} 0 & \text{if } Q'=0 \\ 4 & \text{if } 0 < \lceil Q'/R_{mux} \rceil \leq 4 \\ 8 & \text{if } 4 < \lceil Q'/R_{mux} \rceil \leq 8 \\ N_{symb}^{PUSCH} & \text{if } \lceil Q'/R_{mux} \rceil > 8 \end{cases}$$

The number of SC-FDMA symbols including inserted and punctured control information is given as follows.

$$N_{symb}^{UL\,control2} = \begin{cases} 0 & \text{if } (Q'+S')=0 \\ 4 & \text{if } 0 < \lceil (Q'+S')/R_{mux} \rceil \leq 4 \\ 8 & \text{if } 4 < \lceil (Q'+S')/R_{mux} \rceil \leq 8 \\ N_{symb}^{PUSCH} & \text{if } \lceil (Q'+S')Q'/R_{mux} \rceil > 8 \end{cases}$$

The number of SC-FDMA symbols including punctured control information is given as follows.

$$N_{symb}^{nec} = \begin{cases} 0 & \text{if } (Q'+S')=0 \\ 0 & \text{if } 0 < \lceil (Q'+S')/R_{mux} \rceil \leq 4 \\ 4 & \text{if } 4 < \lceil (Q'+S')/R_{mux} \rceil \leq 8 \\ 8 & \text{if } \lceil (Q'+S')/R_{mux} \rceil > 8 \end{cases}$$

The number of SC-FDMA symbols including punctured control information may additionally be given as follows.

$$N_{symb}^{comp} = \begin{cases} 0 & \text{if } (Q'+S')=0 \\ 4 & \text{if } 0 < \lceil (Q'+S')/R_{mux} \rceil \leq 4 \\ 4 & \text{if } 4 < \lceil (Q'+S')/R_{mux} \rceil \leq 8 \\ N_{symb}^{PUSCH} - N_{symb}^{nec} & \text{if } \lceil (Q'+S')/R_{mux} \rceil > 8 \end{cases}$$

Table 23 illustrates parameters indicating puncturing locations of control information for puncturing.

TABLE 23

| es | ei | ep |
|---|---|---|
| $\lfloor (Q' - N_{symb}^{nec} * R_{mux})/N_{symb}^{comp} \rfloor$ | $R_{mux}$ - es | $R_{mux}$ - es |

$n1_i$ denotes the number of control information modulation symbols (for insertion) within an i-th SC-FDMA symbol transmitting a PUSCH within a subframe.

The number of control modulation symbols mapped to respective SC-FDMA symbols transmitting a PUSCH for a subframe having a normal CP is illustrated in Table 24 to Table 32.

Table 24 illustrates $n1_i$ when $N_{symb}^{ULcontrol1}=4$ in a normal CP subframe without an SRS.

Table 25 illustrates $n1_i$ when $N_{symb}^{ULcontrol1}=4$ in a normal CP subframe with an SRS in the last symbol.

Table 26 illustrates $n1_i$ when $N_{symb}^{ULcontrol1}=4$ in a normal CP subframe with an SRS in the first symbol.

Table 27 illustrates $n1_i$ when $N_{symb}^{ULcontrol1}=8$ in a normal CP subframe without an SRS.

Table 28 illustrates $n1_i$ when $N_{symb}^{ULcontrol1}=8$ in a normal CP subframe with an SRS in the last symbol.

Table 29 illustrates $n1_i$ when $N_{symb}^{ULcontrol1}=8$ in a normal CP subframe with an SRS in the first symbol.

Table 30 illustrates $n1_i$ when $N_{symb}^{ULcontrol}=N_{symb}^{PUSCH}$ in a normal CP subframe without an SRS.

Table 31 illustrates $n1_i$ when $N_{symb}^{ULcontrol}=N_{symb}^{PUSCH}$ in a normal CP subframe with an SRS in the last symbol.

Table 32 illustrates $n1_i$ when $N_{symb}^{ULcontrol}=N_{symb}^{PUSCH}$ in a normal CP subframe with an SRS in the first symbol.

TABLE 24

| i | 0 | 1 | 2 | 3 | 4 | 5 | 6 | 7 | 8 | 9 | 10 | 11 |
|---|---|---|---|---|---|---|---|---|---|---|---|---|
| n1 | 0 | 0 | $\lceil \lfloor Q'/2 \rfloor /2 \rceil$ | $\lfloor \lfloor Q'/2 \rfloor /2 \rfloor$ | 0 | 0 | 0 | 0 | $\lfloor \lceil Q'/2 \rceil /2 \rfloor$ | $\lceil \lceil Q'/2 \rceil /2 \rceil$ | 0 | 0 |

TABLE 25

| i | 0 | 1 | 2 | 3 | 4 | 5 | 6 | 7 | 8 | 9 | 10 |
|---|---|---|---|---|---|---|---|---|---|---|---|
| n1 | 0 | 0 | $\lceil \lfloor Q'/2 \rfloor /2 \rceil$ | $\lfloor \lfloor Q'/2 \rfloor /2 \rfloor$ | 0 | 0 | 0 | 0 | $\lfloor \lceil Q'/2 \rceil /2 \rfloor$ | $\lceil \lceil Q'/2 \rceil /2 \rceil$ | 0 |

TABLE 26

| i | 0 | 1 | 2 | 3 | 4 | 5 | 6 | 7 | 8 | 9 | 10 |
|---|---|---|---|---|---|---|---|---|---|---|---|
| n1 | 0 | $\lceil \lfloor Q'/2 \rfloor /2 \rceil$ | $\lfloor \lfloor Q'/2 \rfloor /2 \rfloor$ | 0 | 0 | 0 | 0 | $\lfloor \lceil Q'/2 \rceil /2 \rfloor$ | $\lceil \lceil Q'/2 \rceil /2 \rceil$ | 0 | 0 |

TABLE 27

| i | 0 | 1 | 2 | 3 | 4 | 5 |
|---|---|---|---|---|---|---|
| n1 | 0 | $\lceil \lfloor (Q' - 4 * Rmux)/2 \rfloor /2 \rceil$ | Rmux | Rmux | $\lfloor \lfloor (Q' - 4 * Rmux)/2 \rfloor /2 \rfloor$ | 0 |
| i | 6 | 7 | 8 | 9 | 10 | 11 |
| n1 | 0 | $\lfloor \lceil (Q' - 4 * Rmux)/2 \rceil /2 \rfloor$ | Rmux | Rmux | $\lceil \lceil (Q' - 4 * Rmux)/2 \rceil /2 \rceil$ | 0 |

TABLE 28

| i | 0 | 1 | 2 | 3 | 4 | 5 |
|---|---|---|---|---|---|---|
| n1 | 0 | $\lceil \lfloor (Q' - 4 * Rmux)/2 \rfloor /2 \rceil$ | Rmux | Rmux | $\lfloor \lfloor (Q' - 4 * Rmux)/2 \rfloor /2 \rfloor$ | 0 |
| i | 6 | 7 | 8 | 9 | 10 | |
| n1 | 0 | $\lfloor \lceil (Q' - 4 * Rmux)/2 \rceil /2 \rfloor$ | Rmux | Rmux | $\lceil \lceil (Q' - 4 * Rmux)/2 \rceil /2 \rceil$ | |

TABLE 29

| i | 0 | 1 | 2 | 3 | 4 |
|---|---|---|---|---|---|
| n1 | $\lceil \lfloor (Q' - 4 * Rmux)/2 \rfloor /2 \rceil$ | Rmux | Rmux | $\lfloor \lfloor (Q' - 4 * Rmux)/2 \rfloor /2 \rfloor$ | 0 |
| i | 5 | 6 | 7 | 8 | 9 | 10 |
| n1 | 0 | $\lfloor \lceil (Q' - 4 * Rmux)/2 \rceil /2 \rfloor$ | Rmux | Rmux | $\lceil \lceil (Q' - 4 * Rmux)/2 \rceil /2 \rceil$ | 0 |

TABLE 30

| i | 0 | 1 | 2 | 3 | 4 | 5 |
|---|---|---|---|---|---|---|
| n1 | $\lceil \lfloor (Q' - 8 * Rmux)/2 \rfloor /2 \rceil$ | Rmux | Rmux | Rmux | Rmux | $\lfloor \lfloor (Q' - 8 * Rmux)/2 \rfloor /2 \rfloor$ |
| i | 6 | 7 | 8 | 9 | 10 | 11 |
| n1 | $\lfloor \lceil (Q' - 8 * Rmux)/2 \rceil /2 \rfloor$ | Rmux | Rmux | Rmux | Rmux | $\lceil \lceil (Q' - 8 * Rmux)/2 \rceil /2 \rceil$ |

TABLE 31

| i | 0 | 1 | 2 | 3 | 4 | 5 |
|---|---|---|---|---|---|---|
| n1 | $\lceil (Q' - 8 * Rmux)/3 \rceil$ | Rmux | Rmux | Rmux | Rmux | $\lfloor (Q' - 8 * Rmux)/3 \rfloor$ |
| i | 6 | 7 | 8 | 9 | 10 | |
| n1 | $\lfloor (Q' - 8 * Rmux)/3 + 0.5 \rfloor$ | Rmux | Rmux | Rmux | Rmux | |

TABLE 32

| i | 0 | 1 | 2 | 3 | 4 |
|---|---|---|---|---|---|
| n1 | | Rmux | Rmux | Rmux | Rmux | $\lfloor (Q' - 8 * Rmux)/3 \rfloor$ |
| i | 5 | 6 | 7 | 8 | 9 | 10 |
| n1 | $\lfloor (Q' - 8 * Rmux)/3 + 0.5 \rfloor$ | Rmux | Rmux | Rmux | Rmux | $\lceil (Q' - 8 * Rmux)/3 \rceil$ |

The number of control modulation symbols mapped to respective SC-FDMA symbols transmitting a PUSCH for a subframe having an extended CP is illustrated in Table 33 to Table 41.

Table 33 illustrates $n1_i$ when $N_{symb}^{ULcontrol1}=4$ in an extended CP subframe without an SRS.

Table 34 illustrates $n1_i$ when $N_{symb}^{ULcontrol1}=4$ in an extended CP subframe with an SRS in the last symbol.

Table 35 illustrates $n1_i$ when $N_{symb}^{ULcontrol1}=4$ in an extended CP subframe with an SRS in the first symbol.

Table 36 illustrates $n1_i$ when $N_{symb}^{ULcontrol1}=8$ in an extended CP subframe without an SRS.

Table 37 illustrates $n1_i$ when $N_{symb}^{ULcontrol1}=8$ in an extended CP subframe with an SRS in the last symbol.

Table 38 illustrates $n1_i$ when $N_{symb}^{ULcontrol1}=8$ in an extended CP subframe with an SRS in the first symbol.

Table 39 illustrates $n1_i$ when $N_{symb}^{ULcontrol1}=N_{symb}^{PUSCH}$ in an extended CP subframe without an SRS.

Table 40 illustrates $1_i$ when $N_{symb}^{ULcontrol1}=N_{symb}^{PUSCH}$ in an extended CP subframe with an SRS in the last symbol.

Table 41 illustrates $1_i$ when $N_{symb}^{ULcontrol1}=N_{symb}^{PUSCH}$ in an extended CP subframe with an SRS in the first symbol.

TABLE 33

| i | 0 | 1 | 2 | 3 | 4 | 5 | 6 | 7 | 8 | 9 |
|---|---|---|---|---|---|---|---|---|---|---|
| n1 | 0 | 0 | $\lceil\lfloor Q'/2\rfloor/2\rceil$ | $\lfloor\lfloor Q'/2\rfloor/2\rfloor$ | 0 | 0 | 0 | $\lfloor\lceil Q'/2\rceil/2\rfloor$ | $\lceil\lceil Q'/2\rceil/2\rceil$ | 0 |

TABLE 34

| i | 0 | 1 | 2 | 3 | 4 | 5 | 6 | 7 | 8 |
|---|---|---|---|---|---|---|---|---|---|
| n1 | 0 | 0 | $\lceil\lfloor Q'/2\rfloor/2\rceil$ | $\lfloor\lfloor Q'/2\rfloor/2\rfloor$ | 0 | 0 | 0 | $\lfloor\lceil Q'/2\rceil/2\rfloor$ | $\lceil\lceil Q'/2\rceil/2\rceil$ |

TABLE 35

| i | 0 | 1 | 2 | 3 | 4 | 5 | 6 | 7 | 8 |
|---|---|---|---|---|---|---|---|---|---|
| n1 | 0 | $\lceil\lfloor Q'/2\rfloor/2\rceil$ | $\lfloor\lfloor Q'/2\rfloor/2\rfloor$ | 0 | 0 | 0 | $\lfloor\lceil Q'/2\rceil/2\rfloor$ | $\lceil\lceil Q'/2\rceil/2\rceil$ | 0 |

TABLE 36

| i | 0 | 1 | 2 | 3 | 4 |
|---|---|---|---|---|---|
| n1 | 0 | $\lceil(Q'-4*Rmux)/2\rceil/2\rceil$ | Rmux | Rmux | $\lfloor\lfloor(Q'-4*Rmux)/2\rfloor/2\rfloor$ |

| i | 5 | 6 | 7 | 8 | 9 |
|---|---|---|---|---|---|
| n1 | 0 | $\lfloor\lceil(Q'-4*Rmux)/2\rceil/2\rfloor$ | Rmux | Rmux | $\lceil\lceil(Q'-4*Rmux)/2\rceil/2\rceil$ |

TABLE 37

| i | 0 | 1 | 2 | 3 | 4 |
|---|---|---|---|---|---|
| n1 | 0 | $\lceil\lfloor(Q'-4*Rmux)/2\rfloor/2\rceil$ | Rmux | Rmux | $\lfloor\lfloor(Q'-4*Rmux)/2\rfloor/2\rfloor$ |

| i | 5 | 6 | 7 | 8 |
|---|---|---|---|---|
| n1 | $\lceil\lceil(Q'-4*Rmux)/2\rceil/2\rceil$ | $\lfloor\lceil(Q'-4*Rmux)/2\rceil/2\rfloor$ | Rmux | Rmux |

TABLE 38

| i | 0 | 1 | 2 | 3 |
|---|---|---|---|---|
| n1 | $\lceil\lfloor(Q'-4*Rmux)/2\rfloor/2\rceil$ | Rmux | Rmux | $\lfloor\lfloor(Q'-4*Rmux)/2\rfloor/2\rfloor$ |

| i | 4 | 5 | 6 | 7 | 8 |
|---|---|---|---|---|---|
| n1 | 0 | $\lfloor\lceil(Q'-4*Rmux)/2\rceil/2\rfloor$ | Rmux | Rmux | $\lceil\lceil(Q'-4*Rmux)/2\rceil/2\rceil$ |

TABLE 39

| i | 0 | 1 | 2 | 3 | 4 |
|---|---|---|---|---|---|
| n1 | $\lceil(Q'-8*Rmux)/2\rceil$ | Rmux | Rmux | Rmux | Rmux |

| i | 5 | 6 | 7 | 8 | 9 |
|---|---|---|---|---|---|
| n1 | $\lfloor(Q'-8*Rmux)/2\rfloor$ | Rmux | Rmux | Rmux | Rmux |

TABLE 40

| i | 0 | 1 | 2 | 3 | 4 | 5 | 6 | 7 | 8 |
|---|---|---|---|---|---|---|---|---|---|
| n1 | Q'-8*Rmux | Rmux | Rmux | Rmux | Rmux | Rmux | Rmux | Rmux | Rmux |

TABLE 41

| i | 0 | 1 | 2 | 3 | 4 | 5 | 6 | 7 | 8 |
|---|---|---|---|---|---|---|---|---|---|
| n1 | Rmux | Rmux | Rmux | Rmux | Q'-8*Rmux | Rmux | Rmux | Rmux | Rmux |

$n2_i$ denotes the number of control information modulation symbols (for puncturing) within an i-th SC-FDMA. symbol transmitting a PUSCH within a subframe.

$n3_i$ denotes control information location (for puncturing) within an i-th SC-FDMA symbol transmitting a PUSCH within a subframe.

The number of control modulation symbols mapped to respective SC-FDMA symbols transmitting a PUSCH for a subframe having a normal CP is illustrated in Table 42 to Table 50.

Table 42 illustrates $2_i$, $n3_i$, and em when $N_{symb}^{ULcontrol2}=4$ in a normal CP subframe without an SRS.

Table 43 illustrates $n2_i$, $n3_i$, and em when $N_{symb}^{ULcontrol2}=4$ in a normal CP subframe with an SRS in the last symbol.

Table 44 illustrates $2_i$, $n3_i$, and em when $N_{symb}^{ULcontrol2}=4$ in a normal CP subframe with an SRS in the first symbol.

Table 45 illustrates $2_i$, $n3_i$, and em when $N_{symb}^{ULcontrol2}=8$ in a normal CP subframe without an SRS.

Table 46 illustrates $2_i$, $n3_i$, and em when $N_{symb}^{ULcontrol2}=8$ in a normal CP subframe with an SRS in the last symbol.

Table 47 illustrates $2_i$, $n3_i$, and em when $N_{symb}^{ULcontrol2}=8$ in a normal CP subframe with an SRS in the first symbol.

Table 48 illustrates $n2_i n3_i$, and em when $N_{symb}^{ULcontrol2}=N_{symb}^{PUSCH}$ in a normal CP subframe without an SRS.

Table 49 illustrates $2_i n3_i$, and em when $N_{symb}^{ULcontrol2}=N_{symb}^{PUSCH}$ in a normal CP subframe with an SRS in the last symbol.

Table 50 illustrates $2_i n3_i$, and em when $N_{symb}^{ULcontrol2}=N_{symb}^{PUSCH}$ in a normal CP subframe with an SRS in the first symbol.

TABLE 42

| i | 0 | 1 | 2 | 3 | 4 | 5 | 6 | 7 | 8 | 9 | 10 | 11 |
|---|---|---|---|---|---|---|---|---|---|---|---|---|
| n2 | 0 | 0 | $\lfloor\lfloor S'/2\rfloor/2\rfloor$ | $\lceil\lfloor S'/2\rfloor/2\rceil$ | 0 | 0 | 0 | 0 | $\lfloor\lceil S'/2\rceil/2\rfloor$ | $\lceil\lceil S'/2\rceil/2\rceil$ | 0 | 0 |
| n3 | 0 | 0 | 0 | 0 | 0 | 0 | 0 | 0 | 0 | 0 | 0 | 0 |
| em | | | | | | $\lceil S'/4\rceil$ | | | | | | |

TABLE 43

| i  | 0 | 1 | 2 | 3 | 4 | 5 | 6 | 7 | 8 | 9 | 10 |
|----|---|---|---|---|---|---|---|---|---|---|----|
| n2 | 0 | 0 | $\lfloor \lceil S'/2 \rceil /2 \rfloor$ | $\lceil \lceil S'/2 \rceil /2 \rceil$ | 0 | 0 | 0 | 0 | $\lceil \lfloor S'/2 \rfloor /2 \rceil$ | $\lfloor \lfloor S'/2 \rfloor /2 \rfloor$ | 0 |
| n3 | 0 | 0 | 0 | 0 | 0 | 0 | 0 | 0 | 0 | 0 | 0 |
| em |   |   |   |   | $\lceil S'/4 \rceil$ | | | | | | |

TABLE 44

| i  | 0 | 1 | 2 | 3 | 4 | 5 | 6 | 7 | 8 | 9 | 10 |
|----|---|---|---|---|---|---|---|---|---|---|----|
| n2 | 0 | $\lfloor \lceil S'/2 \rceil /2 \rfloor$ | $\lceil \lceil S'/2 \rceil /2 \rceil$ | 0 | 0 | 0 | 0 | $\lceil \lfloor S'/2 \rfloor /2 \rceil$ | $\lfloor \lfloor S'/2 \rfloor /2 \rfloor$ | 0 | 0 |
| n3 | 0 | 0 | 0 | 0 | 0 | 0 | 0 | 0 | 0 | 0 | 0 |
| em |   |   |   |   | $\lceil S'/4 \rceil$ | | | | | | |

TABLE 45

| i  | 0 | 1 | 2 | 3 | 4 | 5 |
|----|---|---|---|---|---|---|
| n2 | 0 | $\lfloor \lceil (S' - \sum_j n2[j])/2 \rceil /2 \rfloor$ | $R_{max} - n1[i]$ | $R_{max} - n1[i]$ | $\lceil \lceil (S' - \sum_j n2[j])/2 \rceil /2 \rceil$ | 0 |
| n3 | 0 | 0 | 1 | 1 | 0 | 0 |

| i  | 6 | 7 | 8 | 9 | 10 | 11 |
|----|---|---|---|---|----|----|
| n2 | 0 | $\lfloor \lceil (S' - \sum_j n2[j])/2 \rceil /2 \rfloor$ | $R_{max} - n1[i]$ | $R_{max} - n1[i]$ | $\lfloor \lfloor (S' - \sum_j n2[j])/2 \rfloor /2 \rfloor$ | 0 |
| n3 | 0 | 0 | 1 | 1 | 0 | 0 |
| em |   |   | $\lceil (S' - \sum_j n2[j])/4 \rceil$ | | | |

$\sum_j n2[j]$, where $j = 2, 3, 8, 9$

TABLE 46

| i  | 0 | 1 | 2 | 3 | 4 | 5 |
|----|---|---|---|---|---|---|
| n2 | 0 | $\lfloor \lceil (S' - \sum_j n2[j])/2 \rceil /2 \rfloor$ | $R_{max} - n1[i]$ | $R_{max} - n1[i]$ | $\lceil \lceil (S' - \sum_j n2[j])/2 \rceil /2 \rceil$ | 0 |
| n3 | 0 | 0 | 1 | 1 | 0 | 0 |

| i  | 6 | 7 | 8 | 9 | 10 |
|----|---|---|---|---|----|
| n2 | 0 | $\lfloor \lceil (S' - \sum_j n2[j])/2 \rceil /2 \rfloor$ | $R_{max} - n1[i]$ | $R_{max} - n1[i]$ | $\lfloor \lceil (S' - \sum_j n2[j])/2 \rceil /2 \rfloor$ |
| n3 | 0 | 0 | 1 | 1 | 0 |
| em |   |   | $\lceil (S' - \sum_j n2[j])/4 \rceil$ | | |

$\sum_j n2[j]$, where $j = 2, 3, 8, 9$

TABLE 47

| i  | 0 | 1 | 2 | 3 | 4 |
|----|---|---|---|---|---|
| n2 | $\lfloor \lceil (S' - \sum_j n2[j])/2 \rceil /2 \rfloor$ | $R_{max} - n1[i]$ | $R_{max} - n1[i]$ | $\lceil \lceil (S' - \sum_j n2[j])/2 \rceil /2 \rceil$ | 0 |
| n3 | 0 | 1 | 1 | 0 | 0 |

TABLE 47-continued

| i | 5 | 6 | 7 | 8 | 9 | 10 |
|---|---|---|---|---|---|---|
| n2 | 0 | $\left\lfloor \left\lfloor \left(S' - \sum_j n2[j]\right)/2 \right\rfloor /2 \right\rfloor$ | $R_{max} - n1[i]$ | $R_{max} - n1[i]$ | $\left\lfloor \left\lfloor \left(S' - \sum_j n2[j]\right)/2 \right\rfloor /2 \right\rfloor$ | 0 |
| n3 | 0 | 0 | 1 | 1 | 0 | 0 |
| em | | | $\left\lfloor \left(S' - \sum_j n2[j]\right)/4 \right\rfloor$ | | | |

$\sum_j n2[j]$, where j = 1, 2, 7, 8

TABLE 48

| i | 0 | 1 | 2 | 3 | 4 | 5 |
|---|---|---|---|---|---|---|
| n2 | $\left\lfloor \left\lfloor \left(S' - \sum_j n2[j]\right)/2 \right\rfloor /2 \right\rfloor$ | $R_{max} - n1[i]$ | $R_{max} - n1[i]$ | $R_{max} - n1[i]$ | $R_{max} - n1[i]$ | $\left\lfloor \left\lfloor \left(S' - \sum_j n2[j]\right)/2 \right\rfloor /2 \right\rfloor$ |
| n3 | 0 | 1 | 1 | 1 | 1 | 0 |

| i | 6 | 7 | 8 | 9 | 10 | 11 |
|---|---|---|---|---|---|---|
| n2 | $\left\lfloor \left\lfloor \left(S' - \sum_j n2[j]\right)/2 \right\rfloor /2 \right\rfloor$ | $R_{max} - n1[i]$ | $R_{max} - n1[i]$ | $R_{max} - n1[i]$ | $R_{max} - n1[i]$ | $\left\lfloor \left\lfloor \left(S' - \sum_j n2[j]\right)/2 \right\rfloor /2 \right\rfloor$ |
| n3 | 0 | 1 | 1 | 1 | 1 | 0 |
| em | | | $\left\lfloor \left(S' - \sum_j n2[j]\right)/4 \right\rfloor$ | | | |

$\sum_j n2[j]$, where j = 1, 2, 3, 4, 7, 8, 9, 10

TABLE 49

| i | 0 | 1 | 2 | 3 | 4 | 5 |
|---|---|---|---|---|---|---|
| n2 | $\left\lfloor \left(S' - \sum_j n2[j]\right)/3 \right\rfloor$ | $R_{max} - n1[i]$ | $R_{max} - n1[i]$ | $R_{max} - n1[i]$ | $R_{max} - n1[i]$ | $\left\lfloor \left(S' - \sum_j n2[j]\right)/3 \right\rfloor$ |
| n3 | 0 | 1 | 1 | 1 | 1 | 0 |

| i | 6 | 7 | 8 | 9 | 10 | |
|---|---|---|---|---|---|---|
| n2 | $\left\lfloor \left(S' - \sum_j n2[j]\right)/3 + 0.5 \right\rfloor$ | $R_{max} - n1[i]$ | $R_{max} - n1[i]$ | $R_{max} - n1[i]$ | $R_{max} - n1[i]$ | |
| n3 | 0 | 1 | 1 | 1 | 1 | |
| em | | | $\left\lfloor \left(S' - \sum_j n2[j]\right)/3 \right\rfloor$ | | | |

$\sum_j n2[j]$, where j = 1, 2, 3, 4, 7, 8, 9, 10

TABLE 50

| i | 0 | 1 | 2 | 3 | 4 |
|---|---|---|---|---|---|
| n7 | | $R_{max} - n1[i]$ | $R_{max} - n1[i]$ | $R_{max} - n1[i]$ | $R_{max} - n1[i]$ | $\left\lfloor \left(S' - \sum_j n2[j]\right)/3 \right\rfloor$ |
| n3 | | 1 | 1 | 1 | 1 | 0 |

| i | 5 | 6 | 7 | 8 | 9 | 10 |
|---|---|---|---|---|---|---|
| n2 | $\left\lfloor \left(S' - \sum_j n2[j]\right)/3 + 0.5 \right\rfloor$ | $R_{max} - n1[i]$ | $R_{max} - n1[i]$ | $R_{max} - n1[i]$ | $R_{max} - n1[i]$ | $\left\lfloor \left(S' - \sum_j n2[j]\right)/3 \right\rfloor$ |
| n3 | 0 | 1 | 1 | 1 | 1 | 0 |
| em | | | $\left\lfloor \left(S' - \sum_j n2[j]\right)/3 \right\rfloor$ | | | |

$\sum_j n2[j]$, where $j = 0, 1, 2, 3, 6, 7, 8, 9$

The number of control modulation symbols mapped to respective SC-FDMA symbols transmitting a PUSCH for a subframe having an extended CP is illustrated in Table 51 to Table 59.

Table 51 illustrates $n2_i$, $n3i$, and em when $N_{symb}^{ULcontrol2}=4$ in an extended CP subframe without an SRS.

Table 52 illustrates $n2_i$, $n3i$, and em when $N_{symb}^{ULcontrol2}=4$ in an extended CP subframe with an SRS in the last symbol.

Table 53 illustrates $n2_i$, $n3i$, and em when $N_{symb}^{ULcontrol2}=4$ in an extended CP subframe with an SRS in the first symbol.

Table 54 illustrates $n2_i$, $n3i$, and em when $N_{symb}^{ULcontrol2}=8$ in an extended CP subframe without an SRS.

Table 55 illustrates $n2_i$, $n3i$, and em when $N_{symb}^{ULcontrol2}=8$ in an extended CP subframe with an SRS in the last symbol.

Table 56 illustrates $n2_i$, $n3i$, and em when $N_{symb}^{ULcontrol2}=4$ in an extended CP subframe with an SRS in the first symbol.

Table 57 illustrates $n2_i$, $n3i$, and em when $N_{symb}^{ULcontrol2}=N_{symb}^{PUSCH}$ in an extended CP subframe without an SRS.

Table 58 illustrates $2_i$, $n3i$, and em when $N_{symb}^{ULcontrol2}=N_{symb}^{PUSCH}$ in an extended CP subframe with an SRS in the last symbol.

Table 59 illustrates $2_i$, $n3i$, and em when $N_{symb}^{ULcontrol2}=N_{symb}^{PUSCH}$ in an extended CP subframe with an SRS in the first symbol.

TABLE 51

| i | 0 | 1 | 2 | 3 | 4 | 5 | 6 | 7 | 8 | 9 |
|---|---|---|---|---|---|---|---|---|---|---|
| n2 | 0 | 0 | $\lfloor \lceil S'/2 \rceil/2 \rfloor$ | $\lceil \lceil S'/2 \rceil/2 \rceil$ | 0 | 0 | 0 | $\lceil \lfloor S'/2 \rfloor/2 \rceil$ | $\lfloor \lfloor S'/2 \rfloor/2 \rfloor$ | 0 |
| n3 | 0 | 0 | 0 | 0 | 0 | 0 | 0 | 0 | 0 | 0 |
| em | | | | | $\lceil S'/4 \rceil$ | | | | | |

TABLE 52

| i | 0 | 1 | 2 | 3 | 4 | 5 | 6 | 7 | 8 |
|---|---|---|---|---|---|---|---|---|---|
| n2 | 0 | 0 | $\lfloor \lceil S'/2 \rceil/2 \rfloor$ | $\lceil \lceil S'/2 \rceil/2 \rceil$ | 0 | 0 | 0 | $\lceil \lfloor S'/2 \rfloor/2 \rceil$ | $\lfloor \lfloor S'/2 \rfloor/2 \rfloor$ |
| n3 | 0 | 0 | 0 | 0 | 0 | 0 | 0 | 0 | 0 |
| em | | | | | $\lceil S'/4 \rceil$ | | | | |

TABLE 53

| i | 0 | 1 | 2 | 3 | 4 | 5 | 6 | 7 | 8 |
|---|---|---|---|---|---|---|---|---|---|
| n2 | 0 | $\lfloor \lceil S'/2 \rceil/2 \rfloor$ | $\lceil \lceil S'/2 \rceil/2 \rceil$ | 0 | 0 | 0 | $\lceil \lfloor S'/2 \rfloor/2 \rceil$ | $\lfloor \lfloor S'/2 \rfloor/2 \rfloor$ | 0 |
| n3 | 0 | 0 | 0 | 0 | 0 | 0 | 0 | 0 | 0 |
| em | | | | $\lceil S'/4 \rceil$ | | | | | |

TABLE 54

| i | 0 | 1 | 2 | 3 | 4 |
|---|---|---|---|---|---|
| n2 | 0 | $\left\lfloor \left\lceil \left(S' - \sum_j n2[j]\right)/2 \right\rceil/2 \right\rfloor$ | $R_{max} - n1[i]$ | $R_{max} - n1[i]$ | $\left\lceil \left\lfloor \left(S' - \sum_j n2[j]\right)/2 \right\rfloor/2 \right\rceil$ |
| n3 | 0 | 0 | 1 | 1 | 0 |

TABLE 54-continued

| i | 5 | 6 | 7 | 8 | 9 |
|---|---|---|---|---|---|
| n2 | 0 | $\left\lfloor \left\lfloor \left(S' - \sum_j n2[j]\right)/2 \right\rfloor / 2 \right\rfloor$ | $R_{max} - n1[i]$ | $R_{max} - n1[i]$ | $\left\lfloor \left\lfloor \left(S' - \sum_j n2[j]\right)/2 \right\rfloor / 2 \right\rfloor$ |
| n3 | 0 | 0 | 1 | 1 | 0 |
| em | | | $\left\lfloor \left(S' - \sum_j n2[j]\right)/4 \right\rfloor$ | | |

$\sum_j n2[j]$, where j = 2, 3, 8, 9

TABLE 55

| i | 0 | 1 | 2 | 3 | 4 |
|---|---|---|---|---|---|
| n2 | 0 | $\left\lfloor \left\lfloor \left(S' - \sum_j n2[j]\right)/2 \right\rfloor / 2 \right\rfloor$ | $R_{max} - n1[i]$ | $R_{max} - n1[i]$ | $\left\lfloor \left\lfloor \left(S' - \sum_j n2[j]\right)/2 \right\rfloor / 2 \right\rfloor$ |
| n3 | 0 | 0 | 1 | 1 | 0 |

| i | 5 | 6 | 7 | 8 |
|---|---|---|---|---|
| n2 | $\left\lfloor \left\lfloor \left(S' - \sum_j n2[j]\right)/2 \right\rfloor / 2 \right\rfloor$ | $\left\lfloor \left\lfloor \left(S' - \sum_j n2[j]\right)/2 \right\rfloor / 2 \right\rfloor$ | $R_{max} - n1[i]$ | $R_{max} - n1[i]$ |
| n3 | 0 | 0 | 1 | 1 |
| em | | $\left\lfloor \left(S' - \sum_j n2[j]\right)/4 \right\rfloor$ | | |

$\sum_j n2[j]$, where j = 2, 3, 7, 8

TABLE 56

| i | 0 | 1 | 2 | 3 |
|---|---|---|---|---|
| n2 | $\left\lfloor \left\lfloor \left(S' - \sum_j n2[j]\right)/2 \right\rfloor / 2 \right\rfloor$ | $R_{max} - n1[i]$ | $R_{max} - n1[i]$ | $\left\lfloor \left\lfloor \left(S' - \sum_j n2[j]\right)/2 \right\rfloor / 2 \right\rfloor$ |
| n3 | 0 | 1 | 1 | 0 |

| i | 4 | 5 | 6 | 7 | 8 |
|---|---|---|---|---|---|
| n2 | 0 | $\left\lfloor \left\lfloor \left(S' - \sum_j n2[j]\right)/2 \right\rfloor / 2 \right\rfloor$ | $R_{max} - n1[i]$ | $R_{max} - n1[i]$ | $\left\lfloor \left\lfloor \left(S' - \sum_j n2[j]\right)/2 \right\rfloor / 2 \right\rfloor$ |
| n3 | 0 | 0 | 1 | 1 | 0 |
| em | | | $\left\lfloor \left(S' - \sum_j n2[j]\right)/4 \right\rfloor$ | | |

$\sum_j n2[j]$, where j = 1, 2, 6, 7

TABLE 57

| i  | 0 | 1 | 2 | 3 | 4 |
|---|---|---|---|---|---|
| n2 | $\lfloor (S' - \sum_j n2[j])/2 \rfloor$ | $R_{max} - n1[i]$ | $R_{max} - n1[i]$ | $R_{max} - n1[i]$ | $R_{max} - n1[i]$ |
| n3 | 0 | 1 | 1 | 1 | 1 |

| i  | 5 | 6 | 7 | 8 | 9 |
|---|---|---|---|---|---|
| n2 | $\lfloor (S' - \sum_j n2[j])/2 \rfloor$ | $R_{max} - n1[i]$ | $R_{max} - n1[i]$ | $R_{max} - n1[i]$ | $R_{max} - n1[i]$ |
| n3 | 0 | 1 | 1 | 1 | 1 |
| em |   |   | $\lceil (S' - \sum_j n2[j])/2 \rceil$ |   |   |

$\sum_j n2[j]$, where j = 1, 2, 3, 4, 6, 7, 8, 9

TABLE 58

| i  | 0 | 1 | 2 | 3 | 4 | 5 | 6 | 7 | 8 |
|---|---|---|---|---|---|---|---|---|---|
| n2 | $S' - \sum_j n2[j]$ | $R_{max} - n1[i]$ | $R_{max} - n1[i]$ | $R_{max} - n1[i]$ | $R_{max} - n1[i]$ | $R_{max} - n1[i]$ | $R_{max} - n1[i]$ | $R_{max} - n1[i]$ | $R_{max} - n1[i]$ |
| n3 | 0 | 1 | 1 | 1 | 1 | 1 | 1 | 1 | 1 |
| em |   |   |   |   | $S' - \sum_j n2[j]$ |   |   |   |   |

$\sum_j n2[j]$, where j = 1, 2, 3, 4, 5, 6, 7, 8

TABLE 59

| i  | 0 | 1 | 2 | 3 | 4 | 5 | 6 | 7 | 8 |
|---|---|---|---|---|---|---|---|---|---|
| n2 | $R_{max} - n1[i]$ | $R_{max} - n1[i]$ | $R_{max} - n1[i]$ | $R_{max} - n1[i]$ | $S' - \sum_j n2[j]$ | $R_{max} - n1[i]$ | $R_{max} - n1[i]$ | $R_{max} - n1[i]$ | $R_{max} - n1[i]$ |
| n3 | 1 | 1 | 1 | 1 | 0 | 1 | 1 | 1 | 1 |
| em |   |   |   |   | $S' - \sum_j n2[j]$ |   |   |   |   |

$\sum_j n2[j]$, where j = 0, 1, 2, 3, 5, 6, 7, 8

The control information and data may be multiplexed as follows.

```
Set i to 0
Set e to ei
for (m = 0; m < Rmux ; m++)
    if (m < es)
        for (i = 0; i < N_symb^PUSCH ; i++)
            if (n1[i] > 0)
                insert control information (insert)
                increase control information (insert) index
                n1[i]--
            else
                insert data
                increase data index
            end if
            increase output index
        end for
    else
```

```
            e = e - em
            if (e <= 0)
                for (i = 0; i < N_symb^PUSCH ; i++)
                    if (n1[i] > 0)
                        insert control information (insert)
                        increase control information (insert) index
                        n1[i]--
                    els if (n3[i] > 0)
                        puncture data
                        increase control information (puncturing) index
                        increase data index
                        n3[i]--;
                    else
                        insert data
                        increase data index
                    end if
                    increase output index
                end for
                e = e + ep
            else
                for (i = 0; i < N_symb^PUSCH ; i++)
                    if (n1[i] > 0)
                        insert control information (insert)
                        increase control information (insert) index
                        n1[i]--
                    els if (n4[i] == 1)
                        puncture data
                        increase control information (puncturing) index
                        increase data index
                        n3[i]--
                    else
                        insert data
                        increase data index
                    end if
                    increase output index
                end for
            end if
        end if
end for
```

Although the above-described exemplary embodiments of the present invention may be used to a UL-SCH of 3GPP, it should be noted that the present invention is not limited thereto.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the present invention may be embodied by a combination of claims which do not have an explicit cited relation in the appended claims or may include new claims by amendment after application, The embodiments of the present invention may be achieved by various means, for example, hardware, firmware, software, or a combination thereof. In a hardware configuration, the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention may be applied to a user equipment, a base station, and other devices of a wireless mobile communication system.

What is claimed is:

1. A method of transmitting uplink signal through a Physical Uplink Shared Channel (PUSCH) by a mobile device in a wireless communication system, the method comprising:

generating multiplexed information by multiplexing a first type of control information and data information; and transmitting the multiplexed information and a second type of control information through the PUSCH, wherein one or more Resource Blocks (RBs) for the PUSCH include N Single Carrier Frequency Division Multiple Access (SC-FDMA) symbols in a slot, wherein the multiplexed information is mapped on a first set of SC-FDMA symbols, and the first set of SC-FDMA symbols includes SC-FDMA symbols other than an $(N-3)^{th}$ SC-FDMA symbol for a reference signal in the slot, and wherein the second type of control information is mapped on $(N-4)^{th}$ and $(N-2)^{th}$ SC-FDMA symbols in the slot, and the second type of control information includes Acknowledgement/Negative Acknowledgement (ACK/NACK) information.

2. The method of claim 1, wherein the multiplexed information is mapped on the first set of SC-FDMA symbols in a time-first way.

3. The method of claim 1, wherein the first type of control information includes channel quality information.

4. The method of claim 1, wherein the first set of SC-FDMA symbols includes all SC-FDMA symbols other than the $(N-3)^{th}$ SC-FDMA symbol for the reference signal in the slot.

5. The method of claim 1, wherein N is 7.

6. A mobile device for use in a wireless communication system, the mobile device comprising:

a signal processing chain for generating multiplexed information by multiplexing a first type of control information and data information, and for transmitting the multiplexed information and a second type of control information through a Physical Uplink Shared Channel (PUSCH), wherein one or more Resource Blocks (RBs) for the PUSCH include N Single Carrier Frequency Division Multiple Access (SC-FDMA) symbols in a slot, wherein the multiplexed information is mapped on a first set of SC-FDMA symbols, and the first set of SC-FDMA symbols includes SC-FDMA symbols other than an $(N-3)^{th}$ SC-FDMA symbol for a reference signal in the slot, and wherein the second type of control information is mapped on $(N-4)^{th}$ and $(N-2)^{th}$ SC-FDMA symbols in the slot, and the second type of control information includes Acknowledgement/Negative Acknowledgement (ACK/NACK) information.

7. The mobile device of claim 6, wherein the multiplexed information is mapped on the first set of SC-FDMA symbols in a time-first way.

8. The mobile device of claim 6, wherein the first type of control information includes channel quality information.

9. The mobile device of claim 6, wherein the first set of SC-FDMA symbols includes all SC-FDMA symbols other than the $(N-3)^{th}$ SC-FDMA symbol for the reference signal in the slot.

10. The mobile device of claim 6, wherein N is 7.

* * * * *